US011371933B2

(12) United States Patent
Swett

(10) Patent No.: US 11,371,933 B2
(45) Date of Patent: Jun. 28, 2022

(54) ELECTROMAGNETIC METAMATERIAL CELLS, DETECTORS COMPRISING THE SAME, AND METHODS OF THEIR USE

(71) Applicant: Saudi Arabian Oil Company, Dhahran (SA)

(72) Inventor: Dwight W. Swett, Cypress, TX (US)

(73) Assignee: SAUDI ARABIAN OIL COMPANY, Dhahran (SA)

(*) Notice: Subject to any disclaimer, the term of this patent is extended or adjusted under 35 U.S.C. 154(b) by 14 days.

(21) Appl. No.: 17/117,689

(22) Filed: Dec. 10, 2020

(65) Prior Publication Data
US 2021/0199570 A1 Jul. 1, 2021

Related U.S. Application Data

(60) Provisional application No. 62/946,363, filed on Dec. 10, 2019.

(51) Int. Cl.
*G01N 21/3577* (2014.01)
*G01J 3/10* (2006.01)
(Continued)

(52) U.S. Cl.
CPC .......... *G01N 21/3577* (2013.01); *G01J 3/108* (2013.01); *G01J 3/42* (2013.01);
(Continued)

(58) Field of Classification Search
CPC ........ G01N 21/3577; G01J 3/108; G01J 3/42; G01J 5/0853
See application file for complete search history.

(56) References Cited

U.S. PATENT DOCUMENTS 8,803,637 B1 8/2014 Peralta et al.
8,833,510 B2 9/2014 Koh et al.
(Continued)

FOREIGN PATENT DOCUMENTS

CN 107 317 117 A 11/2017
CN 208 621 775 U 3/2019
(Continued)

OTHER PUBLICATIONS

Luigi La Spada, Chris Spooner, Sajad Haq, Yang Hao (www.nature.com/scientific reports, Received Jul. 24, 2018, Accepted Nov. 15, 2018) (Year: 2018).*
(Continued)

*Primary Examiner* — Hugh Maupin
(74) *Attorney, Agent, or Firm* — Osha Bergman Watanabe & Burton LLP

(57) ABSTRACT

Electromagnetic metamaterial cells are described. An example of an electromagnetic metamaterial cell includes spatially separate absorptive features disposed in a planar rotationally symmetric arrangement. Each of the absorptive features may include a curvilinear segment that is convex relative to a center of symmetry of the arrangement. In some embodiments, each of the absorptive features includes one or more forks extending from the curvilinear segment. Each of the one or more forks may include a stem and at least two tines extending from the stem. The electromagnetic metamaterial cell may be included in a detector, such as a microbolometer, which itself may be included in a Fourier-transform infrared spectroscopy (FTIR) system. In some embodiments, the FTIR system may be used to characterize fluid in a wellbore. The fluid may be a drilling fluid or a downhole fluid, such as crude oil.

32 Claims, 10 Drawing Sheets

(51) Int. Cl.
  *G01J 3/42* (2006.01)
  *G01J 5/08* (2022.01)
  *G01J 5/20* (2006.01)
  *G02B 1/00* (2006.01)
  *G01N 21/35* (2014.01)

(52) U.S. Cl.
  CPC .............. *G01J 5/0853* (2013.01); *G01J 5/20* (2013.01); *G02B 1/002* (2013.01); *G01N 2021/3595* (2013.01)

(56) References Cited

U.S. PATENT DOCUMENTS

| | | |
|---|---|---|
| 9,159,119 B2 | 10/2015 | Shechtman et al. |
| 9,404,804 B1 | 8/2016 | Liu et al. |
| 9,952,343 B2 | 4/2018 | Swett |
| 9,954,512 B2 | 4/2018 | Rinaldi et al. |
| 10,054,707 B2 | 8/2018 | Swett |
| 2012/0328240 A1* | 12/2012 | Ma .................. G02B 1/002 385/33 |
| 2016/0041093 A1 | 2/2016 | Yen et al. |
| 2017/0261377 A1 | 9/2017 | Alves et al. |
| 2018/0024265 A1* | 1/2018 | Swett ................ G01V 1/52 367/35 |
| 2019/0162486 A1* | 5/2019 | Cohen ................ H02J 50/12 |

FOREIGN PATENT DOCUMENTS

| | | |
|---|---|---|
| WO | WO-2009/116956 A1 | 9/2009 |
| WO | WO-2013/089548 A2 | 6/2013 |
| WO | WO-2020/056337 A1 | 3/2020 |
| WO | WO-2021/116923 A1 | 6/2021 |

OTHER PUBLICATIONS

Hooge, F. N., 1/f Noise, Physica, 83(B):14-23 (1976).
Jones, R. C., Performance of detectors for visible and infrared radiation, Advances in Electronics, 5:27-30 (1952).
Pergament, A. L. et al., Influence of Doping on the Properties of Vanadium Dioxide Gel Films, Jrnl. of Physics: Condensed Matter, 20:1-9 (2008).
Pergament, A. L. et al., Vanadium Dioxide: Metal-Insulator Transition, Electrical Switching and Oscillations. A Review of State of the Art and Recent Progress, Presented at Energy Materials and Nanotechnology (EMN) Meeting on Computation and Theory, Istanbul, Turkey (Nov. 2015).
Rogalski, A. W. et al., Antiomonide-based Infrared Detectors: A New Perspective, SPIE, 2018.
Samanta, A. et al., Interactions between Acidic Crude Oil and Alkali and Their Effects on Enhanced Oil Recovery, Energy & Fuels, 25:1642-49 (2011).
Almasri, M. et al., Self-Supporting Uncooled Infrared Microbolometers With Low-Thermal Mass, Jrnl. Microelectro. Systems, 10(3):1-8 (2001).
Huang, X. et al., Multiband Ultrathin Polarization-Insensitive Terahertz Perfect Absorbers With Complementary Metamaterial and Resonator Based on High-Order Electric and Magnetic Resonances, IEEE Photonics Jrnl., 10(6): 1-12 (2018).
Jung, J. et al., Infrared broadband metasurface absorber for reducing the thermal mass of a microbolometer, Sci. Repo., 7:430, 8 pages (2017).
Laurent, L. et al., 12-μm-Pitch Electromechanical Resonator for Thermal Sensing, Phys. Rev. App., 9:024016, 11 pages (2018).
Swett, D. W., Near Zero Index Perfect Metasurface Absorber using Inverted Conformal Mapping, Sci. Repo., 1-14 (2020).
International Search Report for PCT/IB2020/061667, 7 pages (dated May 28, 2021).
Invitation to Pay Additional Fees for PCT/IB2020/061667, 12 pages (dated Mar. 30, 2021).
Written Opinion for PCT/IB2020/061667, 12 pages (dated May 28, 2021).

* cited by examiner

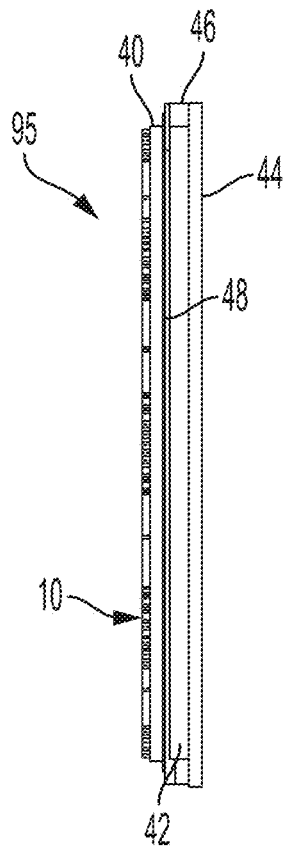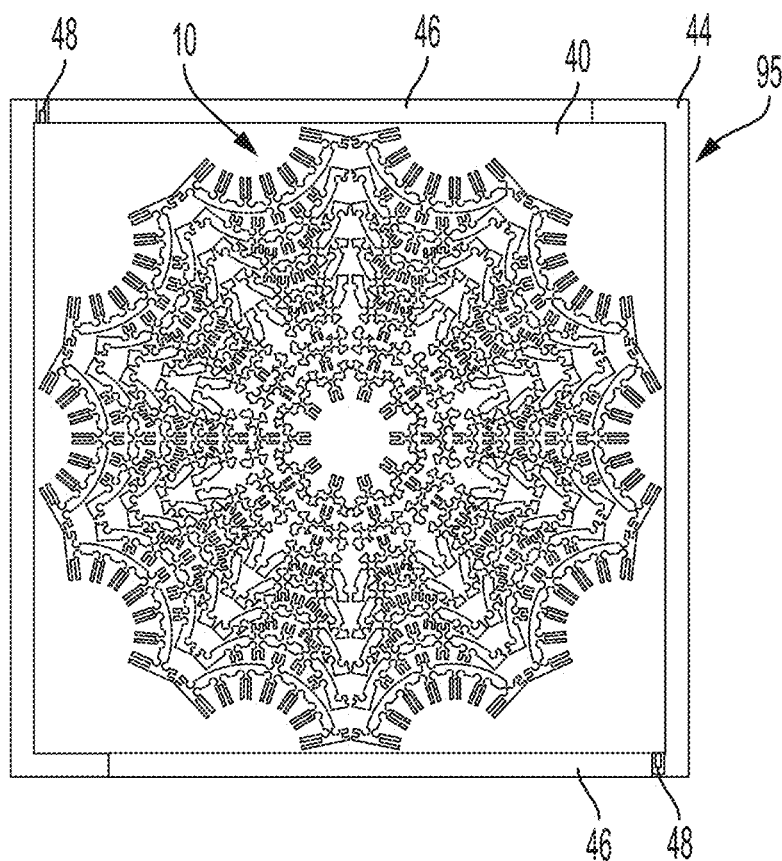
FIG. 3A  FIG. 3B
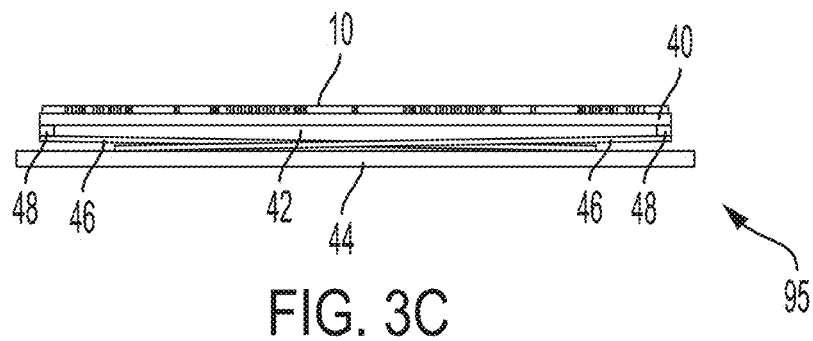
FIG. 3C

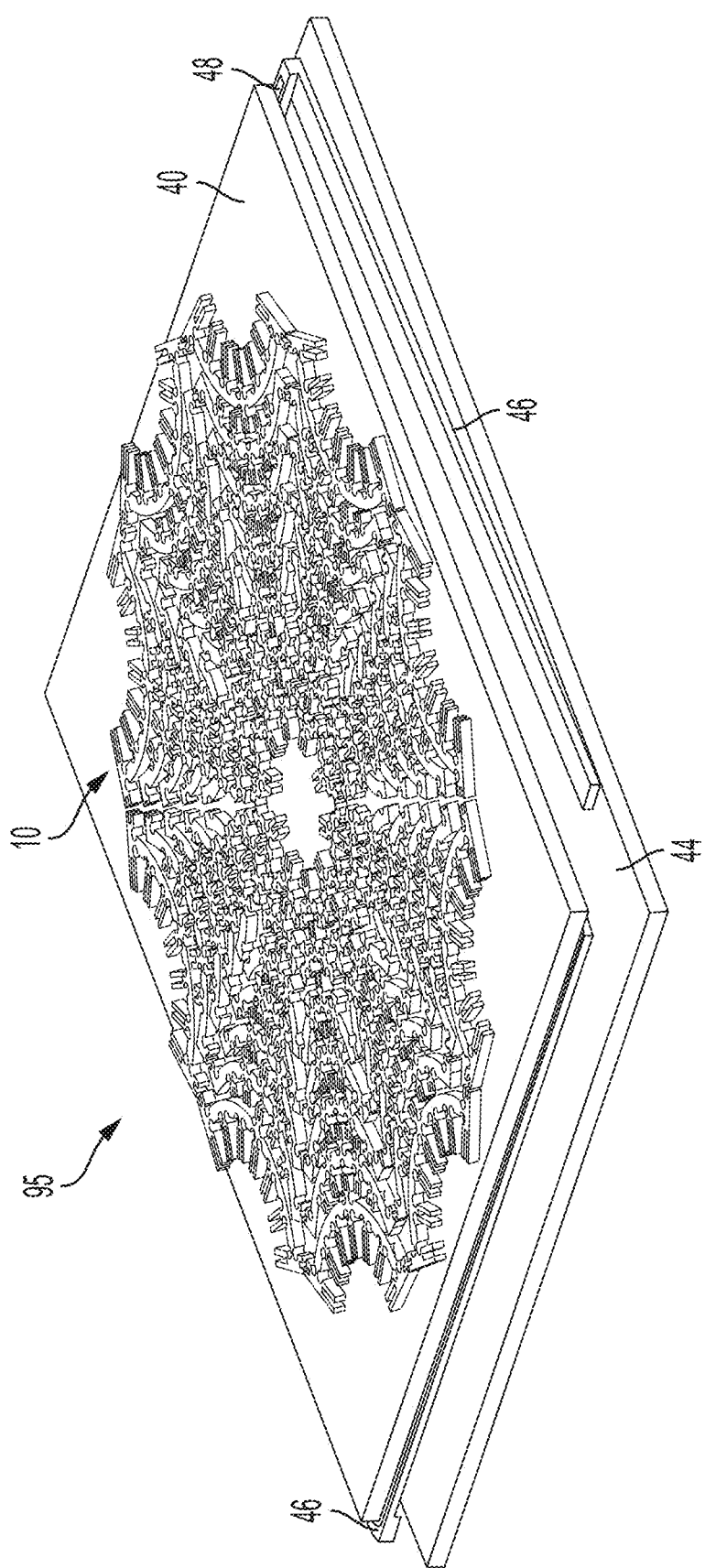

ELECTROMAGNETIC METAMATERIAL CELLS, DETECTORS COMPRISING THE SAME, AND METHODS OF THEIR USE

PRIORITY APPLICATION

This application claims the benefit of U.S. Provisional Patent Application No. 62/946,363, filed on Dec. 10, 2019, the disclosure of which is hereby incorporated by reference herein in its entirety.

TECHNICAL FIELD

This disclosure relates generally to electromagnetic metamaterial cells, methods of their use, and apparatus and systems in which they can be used.

BACKGROUND

Gas chromatography has been utilized extensively for fingerprinting and analyzing reservoir fluids in the evaluation of reservoir compartmentalization and connectivity. Though gas chromatography is practical, it remains a measurement confined to the laboratory. An alternative measurement that can be practically used outside the laboratory, using the electromagnetic resonance characteristics of the fluid, is based upon infrared spectroscopy. Infrared spectroscopy relies on the fact that electromagnetic absorption causes changes in the vibrational and rotational motion of the molecules being irradiated.

Fourier-transform infrared spectroscopy (FTIR) is a particular infrared spectroscopy technique that can be used outside of the laboratory, for example for in situ measurements of fluid(s), gas or liquid, in real-time. FTIR systems may be based on a Michelson-type interferometer coupled with a bolometric detector. In the oil and gas industry, FTIR has been applied in combination with chemometrics and statistical data analysis to achieve rapid rig site chemical analysis of crude oils. However, current detectors have poor detectivities at the modulation frequencies and elevated temperatures associated with an in situ real-time logging environment. Such current detectors rely upon superconductivity, actively cooled, or actively-cooled superconductivity detector technologies.

SUMMARY

The present disclosure includes, inter alia, electromagnetic metamaterial cells. In some embodiments, electromagnetic metamaterial cells are used, for example, in detectors, such as microbolometers, to detect incident electromagnetic radiation. Disclosed electromagnetic metamaterial cells can be used in microbolometers for FTIR. The microbolometers can be used, for example, at ambient temperatures, such as at or near room temperature (~295 Kelvin (K)). That is, in some embodiments, a microbolometer including a metamaterial does not require active cooling (as conventional microbolometers do) in order to have an operationally useful detectivity. The microbolometers can be used to detect electromagnetic radiation over a wide range of infrared (IR) spectrum, such as for a range of wavenumbers from at least 5000 $cm^{-1}$ to at least 600 $cm^{-1}$. Such a microbolometer can be used, for example, for downhole logging of fluid conditions in a drill string or wellbore in real time.

An example of an electromagnetic metamaterial cell includes spatially separate absorptive features. The spatially separate absorptive features may be disposed in a planar arrangement. The planar arrangement may be rotationally symmetric. The absorptive features may each include a curvilinear segment, for example that is convex relative to a center of symmetry of the arrangement. At least some of the absorptive features may include one or more absorptive sub-features, such as one or more forks, for example each including two or more tines. Absorption may be further promoted by inclusion of one or more notches in each curvilinear segment. In some embodiments, such metamaterial cells may absorb at least 90% of incident infrared electromagnetic radiation over a wavenumber range of at least 3500 $cm^{-1}$-2000 $cm^{-1}$ and, for a narrower range of wavenumbers may be a nearly perfect metamaterial absorber (PMA). This infrared wavenumber range is of particular interest for chemical analysis of downhole fluids such as crude oils as many of the primary chemical functional groups of hydrocarbons exhibit electromagnetic resonance signatures in this range. In some embodiments, a detector, such as a microbolometer, includes the example metamaterial cell. An advantage of certain embodiments of a microbolometer including the example metamaterial cell is that, due to broadband high absorptivity of the metamaterial cell, intrinsic thermal mass of the microbolometer can be reduced such that conventional support layers can be eliminated entirely, thereby reducing thermal mass and improving sensor detectivity as well as total noise level of the microbolometer.

An example of an electromagnetic metamaterial cell includes spatially separate absorptive features disposed in a planar rotationally symmetric arrangement. Each of the absorptive features may include a curvilinear segment that is convex relative to a center of symmetry of the arrangement.

Each of the absorptive features may include one or more absorptive sub-features extending from the curvilinear segment. The one or more absorptive sub-features may be or include one or more forks. One or more sub-features, if present, contribute to absorption of electromagnetic radiation by the absorptive features. Each of the one or more forks may include a stem and at least two tines extending from the stem. In some embodiments, for at least some of the absorptive features, a first fork of the one or more forks extends from an outer side of the curvilinear segment and a second fork of the one or more forks extends from an inner side of the curvilinear segment. In some embodiments, for the at least some of the absorptive features, (i) at least two forks extend from the outer side of the curvilinear segment, (ii) at least two forks extend from the inner side of the curvilinear segment, or (iii) both (i) and (ii). In some embodiments, the first fork and the second fork are aligned. In some embodiments, for at least some of the absorptive features, the one or more forks is a plurality of forks that are disposed on a common side of the curvilinear segment. In some embodiments, the at least two tines have a length to width aspect ratio of at least two. In some embodiments, a spacing between adjacent tines of the at least two tines is less than a width of each of the tines. In some embodiments, each of the at least two tines is longer than an average width of the curvilinear segment.

The curvilinear segment of each absorptive feature may include one or more notches disposed at a perimeter of the curvilinear segment. In some embodiments, each of the one or more notches is disposed at a junction of a stem of a fork extending from the curvilinear segment and the curvilinear segment. In some embodiments, a notch is disposed on each side of the stem of the fork.

The rotationally symmetric arrangement of absorptive features may have at least a three-fold symmetry. The rotationally symmetric arrangement may have at least five-fold symmetry and no more than twelve-fold symmetry. The rotationally symmetric arrangement may have seven-fold symmetry.

The absorptive features may be disposed in a plurality of concentric sub-arrangements. The concentric sub-arrangements may be radially aligned. In some embodiments, for each of the absorptive features in at least some of the plurality of concentric sub-arrangements, a spacing of the one or more forks along the curvilinear segment is substantially constant relative to a size of the curvilinear segment. In some embodiments, for each of the absorptive features in at least some of the plurality of concentric sub-arrangements, a size of the one or more forks relative to the curvilinear segment is substantially constant. In some embodiments, in at least some of the plurality of concentric sub-arrangements, a minimum clearance between absorptive features in one concentric sub-arrangement and absorptive features in an adjacent sub-arrangement is substantially constant. The arrangement of absorptive features may be based on a transform of concentric rhodonea curves. The transform may be given by:

$$x = \frac{1}{\rho}\sqrt{\rho+u} - \sqrt{\frac{8}{u}}, y = \frac{1}{\rho}\sqrt{\rho-u}, \text{ where } \rho = \sqrt{u^2+v^2}.$$

Each of the absorptive features may include gold, for example may be made essentially of gold. The metamaterial cell may have an average thickness from 25 nm to 250 nm, for example from 25 nm to 75 nm or from 125 nm to 175 nm. The metamaterial cell may have an envelope with a diameter of no more than 100 µm.

In some embodiments, the metamaterial cell can absorb infrared electromagnetic radiation. In some embodiments, the metamaterial cell is used in a method that includes disposing the metamaterial cell in a path of incident electromagnetic radiation. At least a portion of the incident electromagnetic radiation may be absorbed with the metamaterial cell. The incident electromagnetic radiation may be infrared electromagnetic radiation. In some embodiments, at least 90% of the at least a portion of the incident electromagnetic radiation in a wavenumber range of 3500 cm$^1$-2000 cm$^1$ is absorbed by the metamaterial cell.

The metamaterial cell may be included in an electromagnetic radiation detector.

The electromagnetic radiation detector may be a photodetector.

The metamaterial cell may be included in a microbolometer. The microbolometer may include a thermometric layer. The metamaterial cell may be disposed on the thermometric layer. The microbolometer may include electrical leads. Each of the electrical leads may be disposed on an opposite end of the thermometric layer. Each of the electrical leads may be disposed in electrical contact with the thermometric layer. The microbolometer may include a substrate. A gap may separate a bottom of the thermometric layer and a top of the substrate. The substrate may be a readout integrated circuit (ROIC). The electrical leads may be electrically connected to the ROIC. In some embodiments, the gap has a thickness in a range from 1 µm to 3 µm.

The electrical leads may be disposed on a bottom side of the thermometric layer. The electrical leads may each be in physical contact with a respective gold contact pad that is in contact with the bottom side of the thermometric layer. The electrical leads may include titanium.

The thermometric layer may include monolithic VO$_2$, such as single crystal VO$_2$. The metamaterial cell may have been formed directly on the thermometric layer. The thermometric layer may have a thickness in a range from 100 nm to 500 nm. The thermometric layer may have a rectangular perimeter. In some embodiments, no side of the perimeter is longer than 100 µm. The thermometric layer may have at least one dimension that is larger than a diameter of an envelope of the electromagnetic metamaterial cell. The at least dimension may be no more than 20% larger than the diameter.

In some embodiments, the gap has a thickness in a range from 1.6 µm to 1.8 µm. In some embodiments, the thermometric layer includes one or more of the following features: it includes VO$_2$, it has an area of no more than 6000 µm$^2$, and it has a thickness in a range from 225 nm to 275 nm. In some embodiments, the metamaterial cell is made essentially of gold and has an envelope with a diameter of no more than 75 µm and no less than 25 µm. The metamaterial cell in the microbolometer may have a thickness in a range from 25 nm to 75 nm. The metamaterial cell in the microbolometer may have a thickness in a range from 125 nm to 175 nm. The electrical leads may include titanium. The electrical leads may each be in physical contact with a respective gold contact pad that is in contact with the bottom side of the thermometric layer. The respective gold contact pad may have a thickness in a range from 20 nm to 60 nm.

The microbolometer may have a detectivity of at least 2×10$^8$ cmHz$^{1/2}$ W$^{-1}$ over a wavenumber range of 600 cm$^{-1}$ to 5000 cm$^{-1}$ at a temperature of 295 K. In some embodiments, the microbolometer is an uncooled microbolometer.

In some embodiments, the microbolometer that includes the metamaterial cell is included in a Fourier-transform infrared spectroscopy (FTIR) system. The FTIR system may include a source of electromagnetic radiation. The FTIR system may be used in a method that includes disposing the FTIR system downhole in a wellbore. Electromagnetic radiation from the source of electromagnetic radiation may then be provided. Energy from the electromagnetic radiation may then be absorbed with the metamaterial cell after the electromagnetic radiation has interacted with a fluid in the wellbore. The fluid may then be characterized based on the absorbed energy spectrum. Characterizing the fluid may occur in real-time. The fluid may be characterized after retrieving the FTIR system from the wellbore. The fluid may be a drilling fluid. The fluid may be a downhole fluid. The downhole fluid may include a crude oil.

Any two or more of the features described in this specification, including in this summary section and in the included drawings, may be combined to form embodiments not specifically expressly described in this specification.

BRIEF DESCRIPTION OF THE DRAWINGS

Drawings are presented here for illustration purposes, not for limitation. Like reference numerals in the drawings generally indicate like or corresponding elements. Figures are not necessarily drawn to scale.

FIG. 3A is a side view of an example of a microbolometer, FIG. 3B is a corresponding plan view, FIG. 3C is a corresponding side view from a second side, and FIG. 3D is a corresponding perspective view, according to illustrative embodiments of the present disclosure.

DETAILED DESCRIPTION OF CERTAIN EMBODIMENTS

Figure 1A:
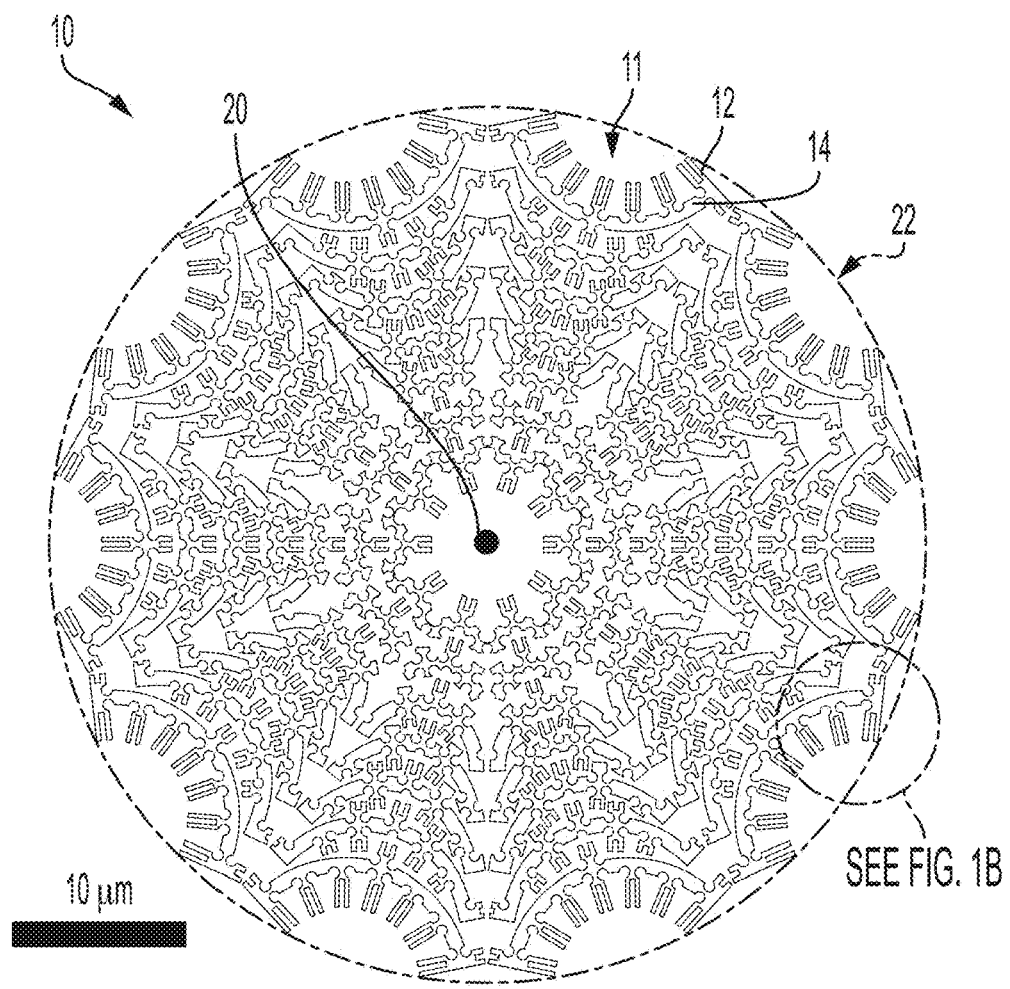
FIG. 1A is a plan view of an example of an electromagnetic metamaterial cell, according to illustrative embodiments of the present disclosure.

It is contemplated that systems, devices, methods, and processes of the disclosure encompass variations and adaptations developed using information from the embodiments expressly described in this specification. Adaptation, modification, or adaptation and modification of the systems, devices, methods, and processes described may be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems according to certain embodiments of the present disclosure that consist essentially of, or consist of, the recited components, and that there are processes and methods according to certain embodiments of the present disclosure that consist essentially of, or consist of, the recited processing steps.

In this application, unless otherwise clear from context or otherwise explicitly stated, (i) the term "a" may be understood to mean "at least one"; (ii) the term "or" may be understood to mean inclusive or; (iii) the terms "comprising" and "including," or forms of these words, may be understood to encompass itemized components or steps whether presented by themselves or together with one or more additional components or steps; and (iv) where ranges are provided, endpoints are included. It should be understood that the order of steps or order for performing certain action is immaterial so long as operability is not lost. Moreover, two or more steps or actions may be conducted simultaneously. Headers are provided for the convenience of the reader and are not intended to be limiting with respect to the claimed subject matter.

This disclosure describes, among other things, metamaterial cells that can be used to absorb incident electromagnetic radiation, for example that has interacted with a sample prior to absorption. Metamaterial cells may include a rotationally symmetric arrangement of spatially separate absorptive features. A metamaterial cell may be disposed on a substrate, such as a thermometric layer. A metamaterial cell may be used in a detector, such as, for example, a microbolometer. A microbolometer may be used in an FTIR system. A microbolometer, for example in an FTIR system, may be used to characterize a fluid, for example, by characterizing its composition. The fluid may be in a wellbore in which the microbolometer is disposed.

Electromagnetic Metamaterial Cells

An electromagnetic metamaterial cell (generally subsequently referred to simply as a "metamaterial cell") may include a plurality of spatially separate absorptive features that can absorb electromagnetic radiation. The plurality of spatially separate absorptive features may be arranged in a planar rotationally symmetric arrangement. The planar rotationally symmetric arrangement may include a plurality of concentric sub-arrangements of subsets of the absorptive features. The subsets of the absorptive features may be radially aligned. Each of the absorptive features may include a curvilinear segment. The curvilinear segment may be convex relative to a center of symmetry of a planar rotationally symmetric arrangement in which the absorptive features are arranged. In some embodiments, for each curvilinear segment in a planar rotationally symmetric arrangement of absorptive features, ends of the curvilinear segment are further from a center of symmetry of the arrangement than a center portion of the curvilinear segment.

Absorptive features may include a backbone, such as a curvilinear segment, and one or more absorptive sub-features extending from the backbone. For example, an absorptive feature may include one or more forks extending from a curvilinear segment. A fork may include at least two tines. A fork may include a stem from which two or more tines extend. The stem may extend from a curvilinear segment. An absorptive feature may include one or more notches, for example disposed on a perimeter of a curvilinear segment. A notch may be disposed at a junction at which an absorptive sub-feature extends from a backbone of an absorptive feature. For example, one or more notches may be disposed where a stem of a fork extends from a curvilinear segment.

An electromagnetic metamaterial cell may be able to absorb infrared electromagnetic radiation, for example having one or more wavelengths in a range of about 700 nanometers (nm) to about 1 millimeter (mm). Without wishing to be bound by any particular theory, altering sizes of absorptive features or absorptive sub-features of absorptive features may alter wavenumbers of electromagnetic radiation that can be absorbed by a metamaterial cell. In some embodiments, a metamaterial cell fits inside an envelope that is a circle of minimum diameter that encompasses all of the absorptive features of the metamaterial cell. In some embodiments, a diameter of an envelope of a metamaterial cell may be no more than 100 micrometers (μm), for example no more than 75 μm. Absorptive features may have a common thickness, for example in a range from 25 nm to 250 nm. The common thickness may be from 25 nm to 75 nm or from 125 nm to 175 nm. A metamaterial cell may be made essentially of (for example, formed from) a metal, for example a highly conductive metal such as silver, gold, copper, or aluminum. In some embodiments, each of the absorptive features of a metamaterial cell includes gold. A metamaterial cell may be made by patterning the cell on a surface, for example by printing (inkjet or screen) or photolithography. The surface may be a surface of a thermometric layer, such as a vanadium dioxide ($VO_2$) layer, as described in further detail in subsequent paragraphs.

FIG. 1A shows a plan view illustrating an example of a metamaterial cell 10 according to some embodiments. The metamaterial cell 10 includes a plurality of absorptive features 11 that are arranged in a planar rotationally symmetric arrangement. The planar rotationally symmetric arrangement includes a plurality of concentric sub-arrangements. In this example, the absorptive features in the concentric sub-arrangements are radially aligned, as can be seen, for example, by centers of corresponding curvilinear segments 14 in each concentric sub-arrangement being collinear along a radius extending from a center of symmetry of the rotationally symmetric arrangement of absorptive features 11. In some embodiments, concentric sub-arrangements of a planar rotationally symmetric arrangement are not radially aligned. Metamaterial cell 10 includes seven concentric sub-arrangements that are radially aligned. In this particular example, the rotational symmetry of the arrangement is ten-fold. In some embodiments, rotational symmetry of a planar rotationally symmetric arrangement is at least three-fold. In some embodiments, the rotational symmetry is at least five-fold and no more than twelve-fold, for example is seven-fold. Each absorptive feature 11 includes a backbone (in this example a curvilinear segment 14) that has one or more absorptive sub-features (in this example forks 12) extending from the backbone. The absorptive features 11 are rotationally symmetric about a center of symmetry 20. Each absorptive feature is convex relative to the center of symmetry 20. The metamaterial cell 10 has an envelope 22 that is a circle of minimum diameter to encompass all of the absorptive features 11 in the metamaterial cell 10. In some embodiments, the diameter of an envelope may be no more than 100 μm, for example no more than 75 μm. Metamaterial cell 10 may have a thickness in a range from 25 nm to 250 nm, for example from 25 nm to 75 nm or from 125 nm to 175 nm. Metamaterial cell 10 can absorb infrared electromagnetic radiation. Although not shown, metamaterial cell 10 can be disposed on a substrate, such as, for example, a thermometric layer.

Figure 1B:
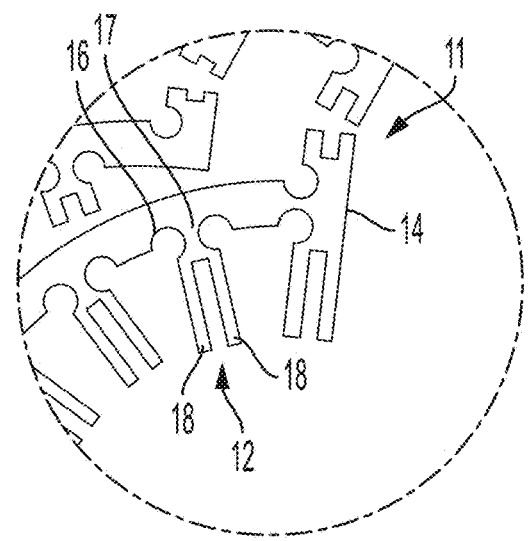
FIG. 1B is a magnified view of a portion of FIG. 1A.

FIG. 1B shows a magnified view of a portion of FIG. 1A. FIG. 1B illustrates curvilinear segment 14 and forks 12. Forks 12 extend from curvilinear segment 14. Specifically, in this example, forks 12 include stem 17 and at least two tines 18. Forks 12 are illustrated as having exactly two tines 18 connected to stem 17. Tines 18 are spaced by a distance less than a width of the individual tines 18, for example where the distance is no more than about 80% of the width and no less than about 20% of the width. Tines 18 have a length to width aspect ratio of at least two. Tines 18 have a length longer than an average width of curvilinear segment 14. Notches 16 are disposed at junctions of stems 17 with curvilinear segment 14. A notch 16 may be disposed on each side of a junction of stem 17 with curvilinear segment 14. Notches 16 are illustrated as having a circularly curved perimeters. Other perimeter shapes, for example polygonal perimeters, are also contemplated. Moreover, in some embodiments, notches 16 are disposed at locations other than or in addition to a junction of stem 17 with curvilinear segment 14. Referring again to FIG. 1A, for at least some of the absorptive features 11, a plurality of forks 12, including a first fork 12, extend from a curvilinear segment 14 with some of the forks 12 extending from a common outer side of curvilinear segment 14 and one or more of the forks 12, including a second fork 12, extend from a common inner side of curvilinear segment 14. The first fork 12 is a central fork 12 on the outer side and the second fork 12 is a central fork 12 on the inner side. The first fork 12 and the second fork 12 are aligned.

In some embodiments, an absorptive feature of a metamaterial cell includes a backbone and one or more absorptive sub-features extending from the backbone. The one or more absorptive sub-features may contribute to absorption of incident electromagnetic radiation by the metamaterial cell. For example, in some embodiments, an absorptive features includes a curvilinear segment and one or more forks extending from the curvilinear segment, each of the one or more forks comprising a stem and at least two tines extending from the stem. An absorptive sub-feature, such as a fork, may extend from an outer side of a backbone, for example away from a center of symmetry of an arrangement that includes the backbone. An absorptive sub-feature may extend from an inner side of a backbone, for example toward a center of symmetry of an arrangement that includes the backbone. A first absorptive sub-feature extending from an outer side and a second absorptive sub-feature extending from an inner side may be aligned. For example, a stem of a first fork and a stem of a second fork, both extending from a common curvilinear segment, may be collinear and thus aligned. A plurality of absorptive sub-features may extend from a common side of a backbone. Any two or more absorptive sub-features may be substantially identical or different. For example, different forks may have different length tines, a different number of tines, or both a different number of tines and different length tines.

In some embodiments, one or more absorptive sub-features extending from different absorptive features have different sizes. For example, in FIG. 1A, different forks 12 extending from different absorptive features 11 have different sizes. In some embodiments, sub-features in concentric sub-arrangements of a planar rotationally symmetric arrangement that are closer to a center of symmetry of the arrangement are smaller than sub-features in concentric sub-arrangements that are further from the center of symmetry. For example, referring again to FIG. 1A, forks 12 of absorptive features 11 that are in sub-arrangements closer to the center of symmetry 20 are smaller than forks 12 of absorptive features 11 that are in sub-arrangements further from the center of symmetry 20.

A size of absorptive sub-features, such as forks, relative to a size of a backbone, such as a curvilinear segment, may be substantially constant (for example, varying no more than 10%) for at least some concentric sub-arrangements in a planar rotationally symmetric arrangement. A spacing of absorptive sub-features, such as forks, along a backbone, such as a curvilinear segment, relative to a size of the backbone may be substantially constant (for example, varying no more than 10%) for at least some concentric sub-arrangements in a planar rotationally symmetric arrangement. A minimum clearance between absorptive features (for example, sub-features extending from backbones of absorptive features) in one concentric sub-arrangement and absorptive features in an adjacent sub-arrangement may be substantially constant (for example, varying no more than 10%). In FIG. 1A, the example of a metamaterial cell 10 includes some such sizes, spacings, and minimum clearances. It is not necessary that relative sizing, relative spacing, or minimum clearance of each and every absorptive sub-feature or absorptive feature in an arrangement be substantially constant even if true (i) for some absorptive sub-features of a given absorptive feature or some absorptive features or (ii) for some absorptive features, for example in one sub-arrangement or some sub-arrangements.

In some embodiments, tines of a fork have a length to width aspect ratio of at least two, for example at least three or at least five. In some embodiments, a spacing between adjacent tines of a fork is less than a width of each of the tines, for example no more than about 80% of the width and no less than about 20% of the width. In some embodiments, tines of a fork are longer than an average width of a curvilinear segment for at least some absorptive features. In some embodiments, each tine of a fork has a same length as each other tine of the fork.

In some embodiments, a backbone (for example, a curvilinear segment) includes one or more notches disposed at a perimeter of the backbone. For example, notches may be uniformly spaced around a perimeter of a backbone. In some embodiments, one or more notches are disposed at a junction of an absorptive sub-feature and a backbone from which the absorptive sub-feature extends. For example, one or more notches may be disposed at junction of a stem of a fork extending from a curvilinear segment and the curvilinear segment. In some embodiments, notches are disposed at locations along a perimeter of a backbone other than or in addition to a junction of an absorptive sub-feature with the backbone. In some embodiments, a notch is disposed on each side of an absorptive sub-feature of a backbone, for example on each side of a stem of a fork.

In some embodiments, a curvilinear segment has a length in a range from 5 μm to 30 μm, for example as measured from end to end along its centerline. In some embodiments, a curvilinear segment has a width (for example, a minimum, maximum, or average width) of from 0.1 to 2 μm, for example from 0.6 μm to 1 μm. In some embodiments, two adjacent tines of a fork are separated by a distance of no more than 1 μm and no less than 0.05 μm, for example no more than 0.5 μm and no less than 0.2 μm. In some embodiments, a tine of a fork has a width of no more than 1 μm and no less than 0.05 μm, for example no more than 0.5 μm and no less than 0.2 μm. In some embodiments, tines of a fork have a length in a range from 0.2 μm to 3 μm. In some embodiments, a metamaterial cell has a thickness (for example a minimum, maximum, or average thickness) in a range from 25 nm to 250 nm, for example from 25 nm to 75 nm or from 125 nm to 175 nm. In some embodiments, a notch has a radius of curvature in a range from 0.05 μm to 0.8 μm, for example when a notch has a circular or polygonal perimeter. In some embodiments, a notch has a radius of curvature in a range from 0.2 μm to 0.4 μm.

An arrangement of absorptive features in an electromagnetic metamaterial cell may be based upon a transformation of a canonical rhodonea conformal mapping geometry. For example, a transformation can effectively "invert" the canonical rhodonea geometry inside-out. In some embodiments, canonical rhodonea conformal curves are described by the relations:

$$x = \frac{1}{\rho}\sqrt{\rho + u} \qquad \text{eqns. (1)}$$

$$y = \frac{1}{\rho}\sqrt{\rho - u}$$

$$\rho = \sqrt{u^2 + v^2}$$

where (u,v) are curvilinear coordinates in the rhodonea map domain, u being analogous to a radial type coordinate and v analogous to an angular type coordinate.

In order to interact with incident electromagnetic waves in a gross absorption manner, a simple transformation of canonical rhodonea conformal curves can be made that modifies the geometric contours. For example the following relations can be used:

$$x = \frac{1}{\rho}\sqrt{\rho + u} - \sqrt{\frac{8}{u}} \qquad \text{eqns. (2)}$$

$$y = \frac{1}{\rho}\sqrt{\rho - u}, \text{ where } = \sqrt{u^2 + v^2}.$$

Figure 2A:
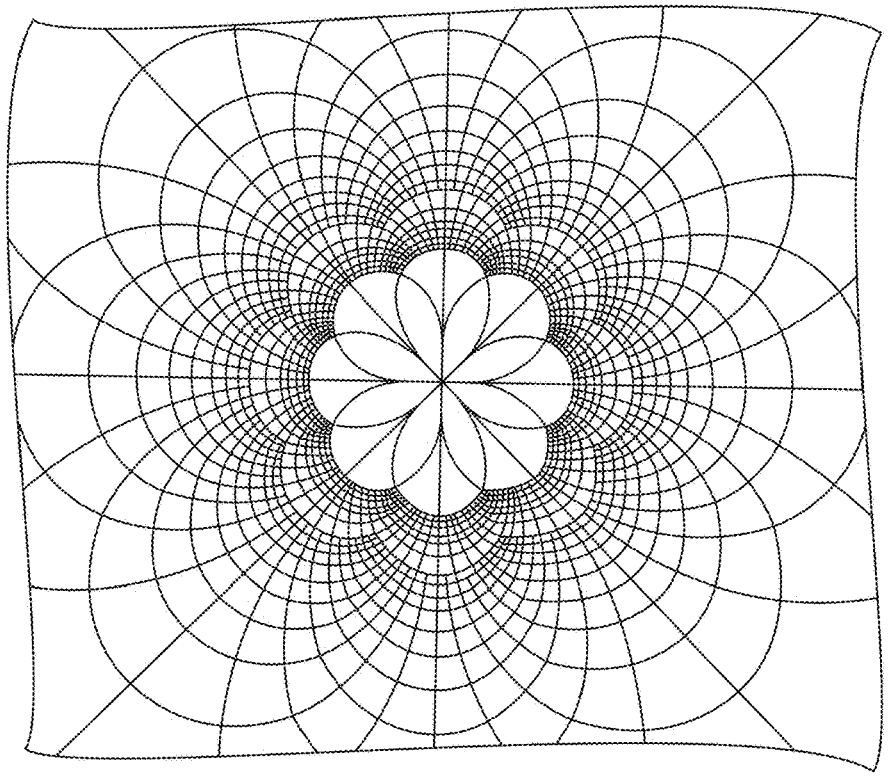
FIG. 2A is an example of canonical rhodonea curves and FIG. 2B is an example of a transformation (in this case geometric inversion) of rhodonea curves, the examples being useful in understanding illustrative embodiments of the present disclosure.
Figure 2B:
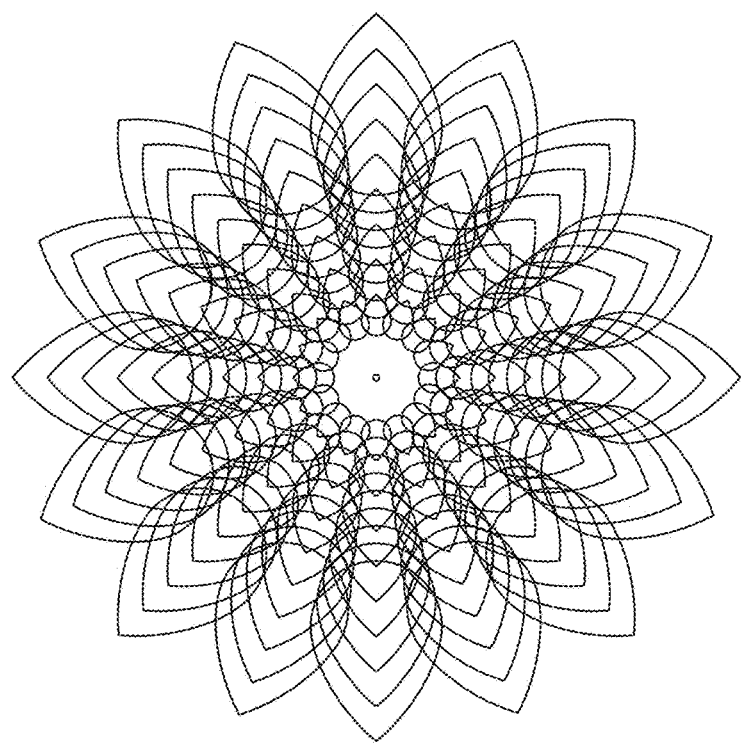

This geometric transformation gives a new set of non-conformal contours that in effect 'invert' the original rhodonea geometry from inside-out. A graphical illustration of the canonical rhodonea conformal contours with the inverted contours is shown in FIGS. 2A and 2B. Metamaterial cell 10 shown in FIGS. 1A and 1B has a planar rotationally symmetric arrangement of absorptive features with radially aligned concentric sub-arrangements of the absorptive features that is based on the transformation given in eqns. (2). In some embodiments, the rotational symmetry of a particular transformation may be deliberately reduced, for example from ten-fold to seven-fold. Such a reduction in symmetry may be made, for example, to, in part, alter the wavenumber range of electromagnetic radiation over which a metamaterial cell absorbs or to allow for more facile formation of a metamaterial cell (for example, by printing). An arrangement with such a deliberately reduced symmetry is considered to be based on the original transformation. "Inversion" of canonical rhodonea curves may result in a non-conformal geometry that interacts grossly with incident electromagnetic waves by manipulating the propagation of the transverse waves in a manner which focuses and dissipates energy within absorptive features disposed in an arrangement based on the transformation.

In some embodiments, a metamaterial cell interacts with incident waves of electromagnetic radiation, for example that transverse waves propagating through the metamaterial cell, such that at least a portion of the electromagnetic radiation is absorbed by dissipation into thermal energy. Without wishing to be bound by any particular theory, absorptive features may absorb energy from incident waves of electromagnetic radiation by one or more of the following mechanisms by which an electromagnetic response of absorptive features in a metamaterial cell causes thermal dissipation. First, absorptive sub-features, such as forks, may act as subwavelength capacitive elements, for example created by the vacuum gap between tines that cyclically charges and discharges in correspondence with one or more harmonics of the incident electromagnetic radiation. Second, where absorptive features include a backbone of curvilinear segments, irregular inductive loops may be formed from the curvilinear segments that act in concert while also cyclically charging and discharging. Third, intrinsic eddy currents may be formed in curvilinear segments due to a cyclic charging and discharging response of capacitive and inductive mechanisms. Eddy currents may create heat losses which act as a net electromagnetic energy absorption mechanism. Fourth, notches may act as defects that further dissipates energy. For example, notches located by junctions of forks with curvilinear segments can, in some embodiments, increase net absorption by 10-12% over corresponding embodiments without notches. When absorptive features are arranged in concentric sub-arrangements, by keeping relative sizing, spacing, minimum clearance or some combination thereof of sub-features, such as forks, relative to backbones, such as curvilinear segments, substantially constant between absorptive features in different concentric sub-arrangements, harmonic inductive and capacitive absorption effects may be realized, thereby improving overall energy absorption capability. In some embodiments, at least 90% of infrared electromagnetic radiation in a wavenumber range of 3500 cm$^1$-2000 cm$^1$ is absorbed by a metamaterial cell.

Detectors Including Electromagnetic Metamaterial Cells

Conventional microbolometer detector devices are usually designed having a micromachined bridge structure suspended over a readout integrated circuit (ROIC) substrate in which one of the materials comprising the laminated bridge structure is a thermometric layer that experiences a change in electrical resistance with temperature change, while other layers function to absorb the infrared energy and support the overall bridge structure. The change in resistance of the thermometric layer is the response detected by the ROIC in the form of a change in voltage drop across the contacts of the bridge under constant bias current. The bridge structure is suspended over the substrate by a gap in order to minimize the thermal conduction path to heat generated in the absorbing layer, allowing the ROIC to compound the effects of incident radiation and enhance the electrical signal created in response to changing field thermography. A reduced thermal conduction path, though, must be balanced against increasing the thermal time constant and reducing the responsiveness to changing incident radiation. The bridge mass can be reduced in order to improve the response time, but usually at a loss of infrared absorptivity and an increase in voltage noise level on the detector. Moving to more rapid frame rates limits the responsivity and detectivity performance and increasing the operational temperatures amplifies detrimental noise levels, both of which have previously combined to limit the operational regime of uncooled microbolometer technologies to the low frequency room temperature applications. High performance applications involving near background radiation limited performance at rapid frame rates have previously been confined to systems that have integrated cryogenic cooling in the detector design. In contrast, in some embodiments, microbolometers that include a metamaterial cell as disclosed can be used in high performance applications without (active) cooling.

Figure 7:
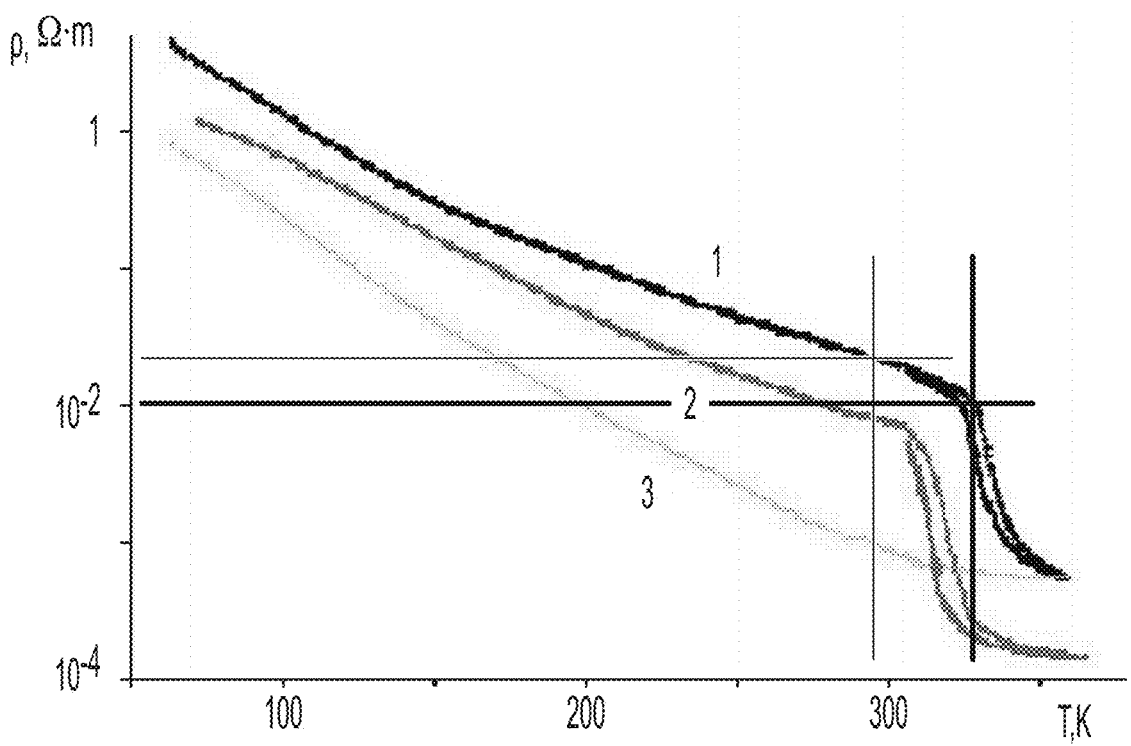
FIG. 7 is a plot of temperature dependence of electron density for (1) undoped vanadium dioxide ($VO_2$), (2) $VO_2$ doped with 3 atom % (at. %) tungsten, and (3) $VO_2$ doped with 12 at. % tungsten.

A metamaterial cell can be used in an electromagnetic radiation detector, such as, for example, a microbolometer or a photodetector. In some embodiments, a microbolometer includes a metamaterial cell, for example a metamaterial cell in accordance with FIGS. 1A-1B. In some embodiments, a microbolometer includes a metamaterial cell disposed on a thermometric layer. A thermometric layer experiences an appreciable change in electrical resistance with a change in temperature, for example as shown in FIG. 7 (discussed further in subsequent paragraphs) for the case of $VO_2$. In some embodiments, a thermometric layer includes $VO_2$. Dissipation of incident electromagnetic radiation by a metamaterial cell causes heating in a thermometric layer that can cause a detectable change in resistance of the layer. Electrical leads may be electrically connected to a thermometric layer on which a metamaterial cell is disposed, for example in order to electrically connect the thermometric layer to a readout integrated circuit (ROIC). An ROIC may be used to process changes in resistance of a thermometric layer due to heating. A substrate on or in which an ROIC is disposed may be coated with a reflective layer, such as a thin gold layer, on a side facing a thermometric layer. A thermometric layer on which a metamaterial cell is disposed may be suspended by a gap over a substrate. For example, electrical leads may act as supports for a bridge structure suspending a thermometric layer over a substrate by a gap. The substrate may be, for example, an ROIC. A bridge structure may be formed, for example, by micromachining. In some embodiments, a microbolometer that includes a metamaterial cell as disclosed here does not require active cooling in order to function as a usable detector, for example in an FTIR system. Thus, in some embodiments, a microbolometer is an uncooled microbolometer.

FIGS. 3A-3D show views of an example of a microbolometer 95. Microbolometer 95 includes metamaterial cell 10, thermometric layer 40, electrical leads 46, substrate 44, and contact pads 48 that electrically connect leads 46 to thermometric layer 40. Thermometric layer 40 having metamaterial cell 10 disposed on it is separated from substrate 44 by gap 42 due to the arrangement of electrical leads 46. Electrical leads 46 are disposed on opposite ends of thermometric layer 40. Electrical leads 46 are disposed on a bottom side of thermometric layer 40. In microbolometer 95, substrate 44 is an ROIC that is coated on a side facing thermometric layer 40 with a gold reflective layer (not separately labelled). An ROIC may detect response of a thermometric layer to incident electromagnetic radiation (dissipated through a metamaterial cell) in the form of a change in voltage drop across electrical leads (through the thermometric layer) under constant bias current. Characterization of a sample (for example of its composition) can then take place based on the detected responses. In some embodiments, a substrate in a microbolometer is not an ROIC and signals are transmitted away from electrical leads to be processed.

In some embodiments, a thermometric layer has a rectangular perimeter. In some embodiments, no side of a polygonal thermometric layer is longer than 100 μm. In some embodiments, a thermometric layer has an area of no more than 6000 μm$^2$, for example no more than 5000 μm$^2$, no more than 4000 μm$^2$, or no more than 3000 μm$^2$. In some embodiments, a thermometric layer has a thickness in a range from 100 nm to 500 nm, for example from 225 nm to 275 nm. In some embodiments, a metamaterial cell has an envelope with a diameter of no more than 100 μm, for example no more than 75 μm and, optionally, no less than 25 μm. In some embodiments, a thermometric layer has at least one dimension (for example a length or a width or both a length and a width) that is larger than a diameter of an envelope of an metamaterial cell and the at least one dimension is no more than 20% larger than the diameter, for no more than 10% larger. For example, a metamaterial cell may have an envelope with a diameter and be disposed on a square thermometric layer having a side length that is no more than 10% longer than the diameter of the envelope. In some embodiments, a metamaterial cell has a thickness in a range from 25 nm to 250 nm, for example from 25 nm to 75 nm or from 125 nm to 175 nm. A bottom of a thermometric layer may be separated from a top of a substrate (for example, an ROIC optionally coated with a reflective layer) by a gap having a thickness in a range from 1 μm to 3 μm, for example from 1.6 μm to 1.8 μm. Electrical leads may have, for example, at least one of a length in a range from 0.5 μm to 1.5 μm and a width in a range from 0.1 μm to 0.4

µm. If present, contact pads disposed between electrical leads and a thermometric layer may have a thickness in a range from 20 nm to 60 nm.

In some embodiments, a metamaterial cell includes a metal, such as silver, gold, copper, or aluminum. In some embodiments, a metamaterial cell includes gold. A metamaterial cell may be formed by printing (such as inkjet printing) or photolithography. In some embodiments, a metamaterial cell has been formed directly on (for example, printed directly onto) a thermometric layer. In some embodiments, a thermometric layer includes $VO_2$, such as a single crystal $VO_2$. Elimination of grain boundaries eliminates crystal defects that can dissipate heat or current. Thus, eliminating grain boundaries may improve performance. Electrical leads may be made from titanium, for example.

Figure 4:
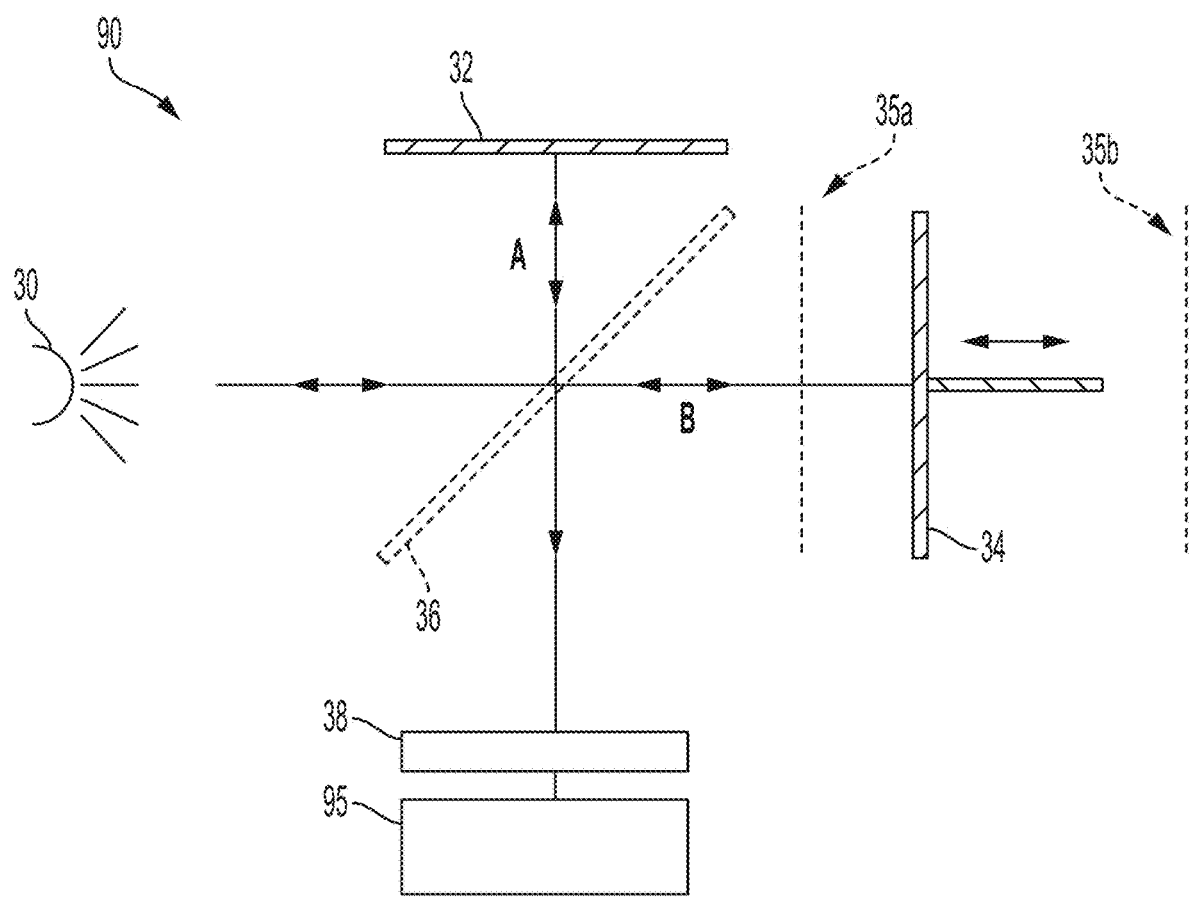
FIG. 4 is an example of an FTIR system that includes a microbolometer that includes a metamaterial cell, according to illustrative embodiments of the present disclosure.

FIG. 4 is a schematic illustration of an FTIR system 90 that includes a microbolometer 95, for example in accordance with FIGS. 3A-D, that includes a metamaterial cell (not labelled), for example in accordance with FIGS. 1A-1B. It is known that all compounds except for elemental diatomic gases such as $N_2$, $H_2$ and $O_2$, have one or more infrared spectral resonances, which implies that the components typically present in downhole fluid compositions can be analyzed from their characteristic infrared absorption bands. In some embodiments, an FTIR system is desirable for in situ downhole fluid monitoring, due to the high modulation frequencies that can be achieved with FTIR. An FTIR system may be based on a Michelson-type interferometer used in tandem with a microbolometer, for example as illustrated schematically in FIG. 4. In addition to microbolometer 95, FTIR system 90 includes source of electromagnetic radiation 30 (for example, an infrared radiation source), fixed mirror 32, beam splitter 36, and moveable mirror 34 having extreme positions 35a-b. FTIR system 90 may be housed such that it can be disposed in a wellbore and fluid in the wellbore (corresponding to sample 38) can flow to be between beam splitter 36 and microbolometer 95. For example, a lumen may be disposed through the housing to allow fluid to be disposed between beam splitter 36 and microbolometer 95. Operation of FTIR system 95 is based upon separating an incident beam of radiation into two beams by means of a beam splitter 36, whereupon a path length difference between the separated beams is introduced by movement of moveable mirror 34 relative to fixed mirror 32. In some embodiments, an FTIR system includes two moveable mirrors. The path length difference creates an interference between the recombined beams at the beam splitter, resulting in a change in the intensity of the output beam as a function of relative path length difference. Intensity of the resulting interferogram can be monitored as a function of path difference using an appropriate detector. Fourier transformation techniques can then be applied to raw interferogram data to convert the spectra from the relative displacement domain to radiation wavelength domain, and this can then be used to analyze absorption spectra characteristics and subsequently the chemical composition of a sample 38.

A sample 38 may be disposed along an optical path of electromagnetic radiation directed from beam splitter 36 toward microbolometer 95 such that electromagnetic radiation first passes through (and possibly interacts with) sample 38 prior to being incident on microbolometer 95, thus allowing sample 38 to be characterized, for example based on whether absorption by the sample 38 has occurred at known absorption peaks of compounds that may or may not be present in sample 38. In some embodiments, a sample is characterized by determining part or all of its composition. Sample 38 can be a fluid, such as fluid in a wellbore. For example fluid can be a downhole fluid in a wellbore, such as crude oil, or a drilling fluid used in or with a drill string during drilling. As metamaterial cells can be of modest size, FTIR systems can be sufficiently small and housed (for example, in a waterproof housing) to deploy into a wellbore during drilling or crude oil extraction. Fluid can be characterized in real-time while an FTIR system is deployed downhole, for example using a data line that transmits data to surface, or it can be characterized after an FTIR system has been retrieved from downhole. For example, an FTIR system can store data locally, for example on a local non-transitory computer readable medium such as flash memory or a hard disk, to be processed once the FTIR system is retrieved. In some embodiments, a method includes disposing an FTIR system downhole in a wellbore, providing electromagnetic radiation from a source in the FTIR system, and characterizing a fluid in the wellbore based on energy absorbed from the electromagnetic radiation after it has interacted with the fluid.

Examples

In order that this specification, including its drawings, may be more fully understood, the following examples are set forth. It should be understood that these examples are for illustrative purposes only and are not to be construed as limiting in any manner.

Example Microbolometer

An example of a microbolometer in accordance with FIGS. 3A-3D, including a metamaterial cell in accordance with FIG. 1, was designed and simulated. The metamaterial cell was made of gold printed to a thickness of 150 nm on a monolithic $VO_2$ layer having a thickness of 250 nm. (Monolithic refers to a single simply connected domain.) In some embodiments, a thermometric layer is a single crystal $VO_2$ layer. The electrical leads were made of titanium, in electrical contact with an ROIC, and contact the $VO_2$ layer on its bottom side through respective gold contact pads having a thickness of 40 nm. The ROIC was coated with a gold reflective layer. A 1.7 µm gap separated the bottom surface of the thermometric layer from a top surface of the ROIC. Table 1 shows dimensions of components of the microbolometer, including the metamaterial cell, and properties that were obtained by the microbolometer.

TABLE 1

| | Value |
|---|---|
| Dimension | |
| $VO_2$ thermometric layer dimensions | 52 µm × 52 µm × 0.25 µm |
| Metamaterial cell envelope | Ø 50 × 0.15 µm |
| Ti electrical lead cross-section | 1 µm × 0.25 µm |
| Property | |
| Resistance (R) (kiloohms (kΩ)) | 80 kΩ |
| Temperature coefficient of resistance (β) (inverse Kelvin (1/K)) | 0.03 1/K |
| Thermal conductance ($G_{th}$) (watts/kelvin (W/K)) | $2.5 \times 10^{-7}$ W/K |
| Thermal capacitance ($C_{th}$) (joules/kelvin (J/K)) | $1.7 \times 10^{-9}$ J/K |
| Maximum absorption | 99.8% |
| Thermal time constant ($\tau_{th}$) (milliseconds (ms)) | 6.82 ms |
| Maximum voltage responsivity ($R_{v,\ max}$) (volts/watt (V/W) at 10 microamps (µA)) | $85.7 \times 10^3$ V/W @ 10 µA |

TABLE 1-continued

| | Value |
|---|---|
| Maximum detectivity (D*) (centimeters(hertz)$^{1/2}$/watt (cm√Hz/W) at 10 μA) | $1.55 \times 10^9$ cm√Hz/W @ 10 μA |

Example Simulations

Figure 5A:
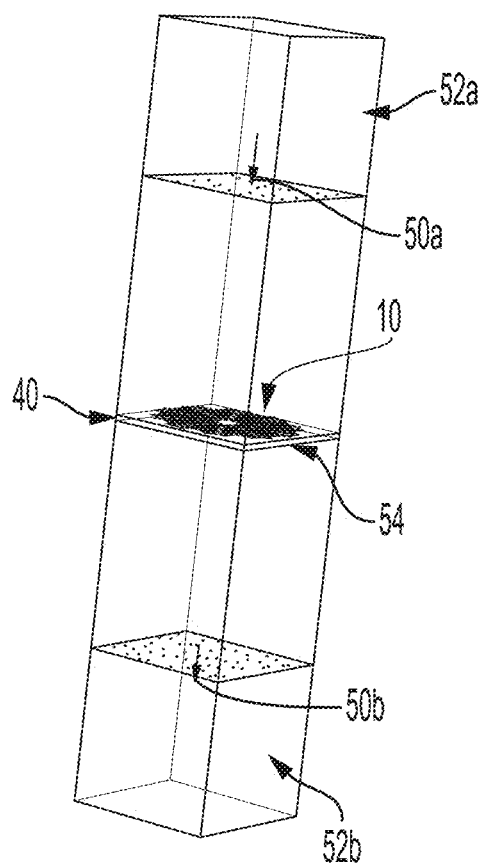
FIGS. 5A and 5B are schematics illustrating a model used to simulate electromagnetic metamaterial cells, according to illustrative embodiments of the present disclosure.
Figure 5B:
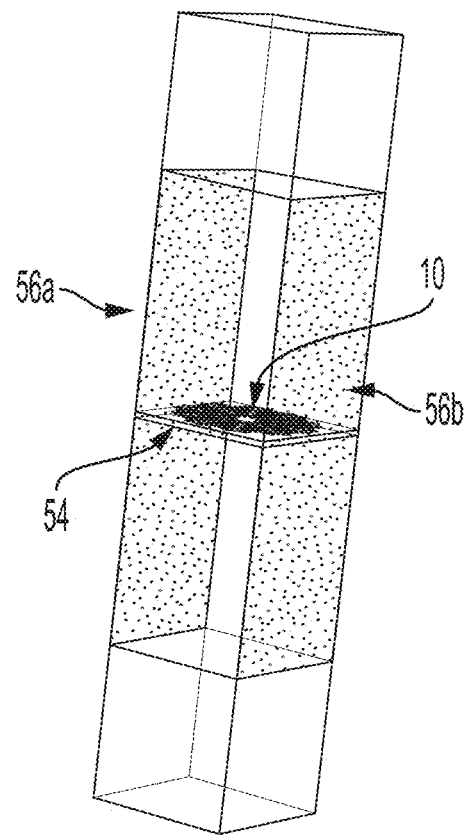

In order to determine the absorption and detector performance characteristics of examples of metamaterial cells, including the example characterized in Table 1, a series of electromagnetic scattering parameter simulations was conducted using the commercially available COMSOL MultiPhysics® (COMSOL Inc., Burlington, Mass.), a finite element analysis software package. The scattering parameters simulation model utilized in the simulations are illustrated in FIGS. 5A-B. As shown in FIGS. 5A-B and described in further detail in the following paragraphs, the model included ports 50a-b, three-dimensional (3D) perfectly matched layers (PMLs) 52a-b, a metamaterial cell geometry 10, a thermometric (for example, VO$_2$) substrate 40, perfect reflector 54, and Floquet boundary conditions 56a-b in the width direction as well as the perpendicular depth direction (not labelled for clarity). Perfect reflector 54 may be a reflective (for example, metal) layer disposed over an ROIC. In these example simulations, perfect reflector 54 is a gold layer disposed over an ROIC 44. The simulations were conducted in the form of a classical 3D waveguide scattering parameter (S-parameter) retrieval analysis where the metamaterial cell geometry 10 is modeled as a 3D geometry of gold that is imprinted on the upper surface of a first 3D layer 40 having the thickness and electromagnetic material properties of a thermometric layer 40. The square cross-section of the waveguide coincides with the cross-section of the thermometric layer 40 which, in this example, is 2 μm larger than the envelope diameter of the metamaterial cell 10. The top surface of a second 3D vacuum gap layer mates with the bottom surface of the thermometric layer, and the vacuum gap bottom surface is defined as a perfectly reflecting boundary condition. The remainder of the waveguide has the properties of free space (vacuum).

The waveguide is excited with an incident transverse magnetic (TM) wave from port 50a and behaves according to:

$$H = H_0[0 H_y 0]$$

$$H_y = e^{ik_0 X} e^{ik_0 Y} \quad \text{eqns. (3)}$$

where $k_0 = \omega/c_0$ is the wavenumber in free space at the electromagnetic frequency $\omega$, and $c_0$ is the speed of light in vacuum. A listening port 50b is located symmetrically about the metamaterial surface from port 50a, but can be redundant due to the perfectly reflecting bottom surface of the vacuum gap. The waveguide boundaries 56a-b perpendicular to the X and Y coordinate directions have Floquet periodic boundary conditions that are typically used for models involving plane waves interacting with periodic structures. Floquet periodic conditions enforce a simple mapping on a source and destination plane pair of boundaries that are of equal shape, requiring a phase shift between the electromagnetic components on the two boundaries defined by a wave vector and a distance vector between the source (src) and destination (dst) plane boundaries:

$$E_{dst} = E_{src} e^{-ik \cdot (R_{dst} - R_{src})}$$

$$H_{dst} = H_{src} e^{-ik \cdot (R_{dst} - R_{src})}$$

$$k = k_x \bar{e}_x + k_y \bar{e}_y + k_z \bar{e}_z \quad \text{eqns. (4)}$$

The metamaterial cell 10 was modeled in this example as a 150 nm thick 3D layer of gold. The electrical permittivity of the gold is frequency dependent upon the incident radiation and was modeled using a Drude relation of the form:

$$\varepsilon(\omega) = \left[1 - \frac{\omega_p^2}{\omega^2 + \gamma^2}\right] + i\left[\frac{\omega_p^2 \gamma}{\omega^3 + \omega \gamma^2}\right] \quad \text{eq. (5)}$$

where $\omega_p = 2.164 \times 10^{15}$ Hz is the plasma frequency, and $\gamma = 16.68 \times 10^{12}$ Hz is the electromagnetic damping frequency. The S-parameters of interest in these example simulations are complex-valued, frequency dependent matrices that are usually retrieved in order to measure the transmission and reflection of electromagnetic waves at different ports of devices like filters, antennas, waveguide transitions, and transmission lines. S-parameters are commonly used in the art of transmission-line theory that is based upon transmitted and reflected voltage waves. For high-frequency problems, such as of interest here, voltage is often not a well-defined variable so S-parameters may be defined in terms of the electric field instead. An assumption in the formulation of the S-parameters retrieval method used in these examples is that all ports are assumed to be connected to matched loads or excitations. That is, it was assumed that there is no reflection directly at any port. Consequently, in some embodiments, both input port 50a and listening 50b are bounded by 3D PMLs 52a-b, as illustrated in FIG. 5A. For the general 2 port scattering simulation, the S-parameters can be defined as:

$$S = \begin{bmatrix} S_{11} & S_{12} \\ S_{21} & S_{22} \end{bmatrix} \quad \text{eq. (6)}$$

in which $S_{11}$ is a reflection coefficient at port 50a, $S_{21}$ is a transmission coefficient due to wave propagation from port 50a to port 50b, $S_{12}$ is a transmission coefficient due to wave propagation from port 50b to port 50a, and $S_{22}$ is a reflection coefficient at port 50b. The time average power reflection/transmission coefficients are obtained as $|S_{ij}|^2$. In the example simulations, the reflecting surface 54 at the ROIC interface nullifies any transmission to and from port 50b. Therefore, the S-parameter matrix of eq. 6 reduces to:

$$S = \begin{bmatrix} S_{11} & 0 \\ 0 & 0 \end{bmatrix} \quad \text{eq. (7)}$$

and the power absorption coefficient for a microbolometer 95 that includes metamaterial cell 10, thermometric layer 40 and reflecting layer 54 over an ROIC 44 can then be written as:

$$A = 1 - |S_{11}|^2 \quad \text{eq. (8)}$$

Figure 6:
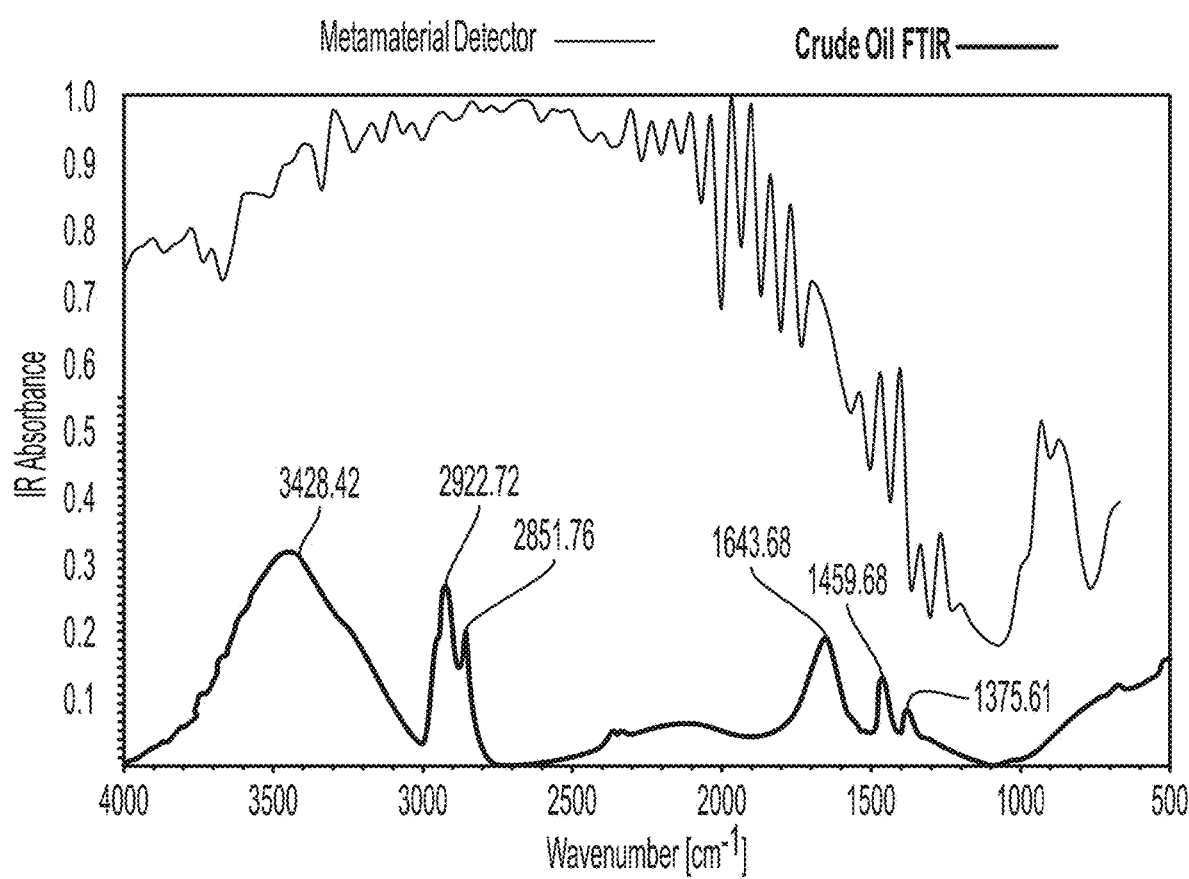
FIG. 6 is a plot of IR absorbance spectra for simulation results and crude oil FTIR spectrum, according to illustrative embodiments of the present disclosure.

The scattering coefficient was retrieved for each simulated metamaterial cell geometry 10, including metamaterial cells 10 in accordance with FIGS. 1A-1B, incorporated into a microbolometer 95, for example in accordance with FIGS. 3A-3D. The resulting IR absorption spectrum for the metamaterial-based detector described in Table 1 is shown in FIG. 6 superimposed with an FTIR absorption spectrum for a crude oil. The plotted FTIR absorption spectrum for a crude oil is taken from A. Samanta, K. Ojha and A. Mandal, "Interactions between Acidic Crude Oil and Alkali and Their Effects on Enhanced Oil Recovery," *Energy & Fuels*, vol. 25, pp. 1642-1649, 2011. The crude oil used by Samanta originated from the Ahmedabad oil field (in India) and has an American Petroleum Institute (API) gravity of 38.86 degrees API (° API) and viscosity of 119 centipoise (cP) at 30 degrees centigrade (° C.). Other crude oils may have different composition (for example, constituents, proportions of the constituents, or both different constituents in different proportions). A description of functional groups, their modes of vibration, and wavenumber absorption ranges for the crude oil of Samanta is summarized in Table 2, which is adapted from Samanta. Where a single value is given, it may correspond to an absorption peak. In the example of the microbolometer summarized in Table 1, the absorption coefficient is more than 90% over a higher wavenumber range from 3500 cm' to 2000 cm$^{-1}$, which, without wishing to be bound by any particular theory, generally indicates the microbolometer has good discrimination of the —CH$_2$, —CH$_3$, and —OH (phenolic) functional groups of the crude oil absorbance peaks. The microbolometer absorption remains near or above 70% for a lower wavenumber range of 2000 cm$^{-1}$ to 500 cm$^{-1}$ which includes the —C=O (carbonyl), —C=C (aromatics), and —C—H (benzene) functional groups.

TABLE 2

| Wavenumber(s) of Absorption (cm$^{-1}$) | Mode of Vibration | Functional Group |
|---|---|---|
| 2852-2852 | C—H stretching | —CH$_2$ and —CH$_3$ of the saturate |
| 2923-2922 | C—H stretching | —CH$_2$ and —CH$_3$ of the saturate |
| 1460 | C—H deformation | —CH$_2$ and —CH$_3$ of the saturate |
| 1376 | C—H symmetric deformation | —CH$_2$ of the saturate |
| 722 | C—H bending | —C—H of substituted benzene |
| 1800-1640 | C=O stretching | —C=O of carbonyl/carboxylic groups |
| 3700-3100 | O—H stretching | —OH |
| 1590-1470 | C=C ring stretching | —C=C of aromatics |

Comparative performance of detectors (in these examples microbolometers) is conventionally characterized by three parameters used as figures of merit. These are voltage responsivity (R$_v$), signal to noise detectivity (D*), and total voltage noise level usually given in terms of a noise equivalent difference temperature (NEDT).

The voltage responsivity R$_v$ is a function of the output voltage signal and the temperature responsivity to changes in incident electromagnetic flux on the detector, and is given by the following relation (adapted from A. Rogalski, M. Kopytko and P. Martyniuk, Antimonide-based Infrared Detectors: A New Perspective, SPIE, 2018):

$$R_v = I_b R \beta R_T = I_b R \beta \frac{\Delta T}{\Delta \Phi_0} \qquad \text{eq. (9)}$$

where:
I$_b$: bias current (measured in amps (A)),
R: bolometer electrical resistance (measured in ohms (Ω)),
β: thermometric layer temperature coefficient of resistance (measured in inverse Kelvin (1/K)),
R$_T$: temperature responsivity of the detector (measured in Kelvins per watt (K/W)),
ΔT: variation in temperature of the detector (measured in Kelvin (K)), and
ΔΦ$_0$: variation in incident radiation flux (measured in watts (W)).

In some embodiments, the temperature change of the detector is a result of the combined effects from thermal conduction through contact leads, and radiation and convection from the detector surfaces. Therefore, the equation of heat balance in the detector can be written as:

$$M_{th}\frac{\partial \Delta T}{\partial t} + G_{th}\Delta T = \eta \Delta \Phi_0 \qquad \text{eq. (10)}$$

where M$_{th}$ is a cumulative heat capacity of the detector, G$_{th}$ is a cumulative thermal conductance of the detector, η is a fraction of incident electromagnetic flux absorbed by the detector, and ΔΦ$_0$ is variation in the incident electromagnetic flux on the detector. The cumulative heat capacity, in the general laminate case, is given by:

$$M_{th} = A_d \Sigma_N m_n \rho_n t_n \qquad \text{eq. (11)}$$

where m$_n$ is heat capacity, ρ$_n$ is mass density, t$_n$ is thickness of each layer 1: N, and A$_d$ is a detector area of radiation incidence. Convective losses can be ignored when a detector is mounted in a hard-vacuum cavity, and remaining thermal conductance is highly dominated by the conduction through the contact lead structures.

Therefore, cumulative thermal conductance G$_{th}$ can be given by:

$$G_{th} = \sum_J K_j \frac{A_j}{L_j} \qquad \text{eq. (12)}$$

where κ$_j$ is thermal conductivity, A$_j$ is cross-sectional area, L$_j$ is length of each contact lead 1: J, the number of contact leads that electrically connect to the metamaterial cell 10. Assuming a harmonic oscillatory incident flux variation, the following relations hold:

$$[M_{th}i\omega + G_{th}]\Delta T e^{i\omega t} = \eta \Delta \Phi_0 e^{i\omega t} \qquad \text{eqns. (13)}$$

$$\Delta T = \left[\frac{\eta \Delta \Phi_0}{G_{th}(1 + \omega^2 \tau_{th}^2)}\right][1 - i\omega \tau_{th}]$$

Where $$\tau_{th} = \frac{M_{th}}{G_{th}}$$

is a thermal time constant of the detector. For magnitudes of the variations in temperature and incident flux density, eqns. (13) can be reduced to:

$$\frac{\Delta T}{\Delta \Phi_0} = \frac{\eta}{G_{th}\sqrt{1 + \omega^2 \tau_{th}^2}} = R_T \qquad \text{eq. (14)}$$

Then, for voltage responsivity $R_v$ (V/W), the following relation holds:

$$R_v = \frac{I_b R \beta \eta}{G_{th}\sqrt{1+\omega^2 \tau_{th}^2}} \quad \text{eq. (15)}$$

in which the temperature coefficient of resistance, $\beta$, is a normalized measure of sensitivity of the thermometric layer material electrical resistance to a change in temperature given by the following relation:

$$\beta = \frac{1}{R}\frac{\partial R}{\partial T}. \quad \text{eq. (16)}$$

It has been found, see R. C. Jones, "Performance of detectors for visible and infrared radiation," *Advances in Electronics*, vol. 5, pp. 27-30, 1952, that for many detectors the signal to noise ratio is a function of the square root of the product of detector area and modulation bandwidth, and a normalized detectivity can then be calculated as:

$$D^* = \frac{R_v}{\Delta V_n}\sqrt{\Delta f A_d} \quad \text{eq. (17)}$$

where $\Delta f$ is electrical amplifier bandwidth, and $\Delta V_n$ is total voltage noise of the detector. The total voltage noise includes Johnson, or thermal, noise as well as 1/f noise seen at low frequencies. The Johnson noise is given by:

$$\frac{\Delta V_{n,j}^2}{\Delta f} = 4kTR \quad \text{eq. (18)}$$

where $$k = 1.38 \times 10^{-23} \frac{J}{K}$$

is Boltzmann's constant, and T is the absolute temperature (K) of the microbolometer. The 1/f noise can be estimated using the Hooge relation for a homogenous semiconductor film:

$$\left[\frac{\Delta R}{R}\right]^2 = \alpha_H\left(\frac{\Delta f}{Nf}\right) \quad \text{eq. (19)}$$

where $a_H$=0.002 is the Hooge coefficient for homogenous semiconductor films, f is modulation frequency, $\Delta f$ is modulation bandwidth, and N is the number of free carriers (electrons) in the sample. Details of the Hooge relation can be found in F. N. Hooge, "1/f Noise," *Physica*, vol. 83, no. B, pp. 14-23, 1976. The Hooge relation, eq. (19), can be rewritten in the form:

$$\frac{\Delta V_{n,H}^2}{\Delta f} = \alpha_H\left(\frac{I_b^2 R^2}{Nf}\right). \quad \text{eq. (20)}$$

An estimate for the total voltage noise in the detector can thus be obtained as:

$$\frac{\Delta V_n^2}{\Delta f} = 4kTR + \alpha_H\left(\frac{I_b^2 R^2}{Nf}\right). \quad \text{eq. (21)}$$

The detector signal to noise detectivity (D*) can then be written more explicitly as:

$$D^* = R_v \sqrt{\frac{A_d}{4kTR + \alpha_H\left(\frac{I_b^2 R^2}{Nf}\right)}}. \quad \text{eq. (22)}$$

Noise equivalent difference temperature (NEDT) denotes the temperature change of a detector due to incident radiation that corresponds to an output signal equal to root mean square (rms) total noise level (a signal-to-noise ratio of 1). This is a fundamental parameter of detector performance and represents the minimum temperature difference that can be discerned above the background noise, and is given by the relation:

$$NEDT = \Delta V_n \frac{\Delta T}{\Delta V_s} = \Delta V_n \frac{R_T}{R_V} \quad \text{eq. (23)}$$

where $\Delta V_s$ is the voltage change for a temperature change of $\Delta T$ on the detector, and $\Delta V_n$ is the rms total noise voltage level.

The normalized detectivity as given by eq. (22) is dependent upon the electrical resistivity of the thermometric layer (for example, $VO_2$ film), while the noise equivalent difference temperature (NEDT) is dependent upon the specific carrier density of the thermometric layer (for example, $VO_2$ film). In the case of $VO_2$ films, trends of electrical resistivity properties of $VO_2$ films with temperature were measured by Pergament et al., see A. L. Pergament, A. A. Velichko, O. Y. O Ya Berezina and E. L. Kazakova, "Influence of Doping on the Properties of Vanadium Dioxide Gel Films," *Journal of Physics: Condensed Matter*, vol. 20, 2008, and are shown in FIG. 7, which plots resistivity, p, given in ohm meters (Ωm) versus temperature given in Kelvin. Line (1) corresponds to undoped vanadium dioxide ($VO_2$); line (2) corresponds to $VO_2$ doped with 3 atom % (at. %) tungsten; and line (3) correspond to $VO_2$ doped with 12 at. % tungsten. The metal-insulator-transition (MIT) and effects of tungsten doping in lowering transition temperature are visible from close inspection of FIG. 7. For an undoped $VO_2$ film the data in FIG. 7 indicate a room temperature resistivity of approximately 2 ohm-centimeters (Ω-cm), which decreases to a value of approximately 1 Ω-cm at the initiation of the MIT at around 35° C.

Figure 8:
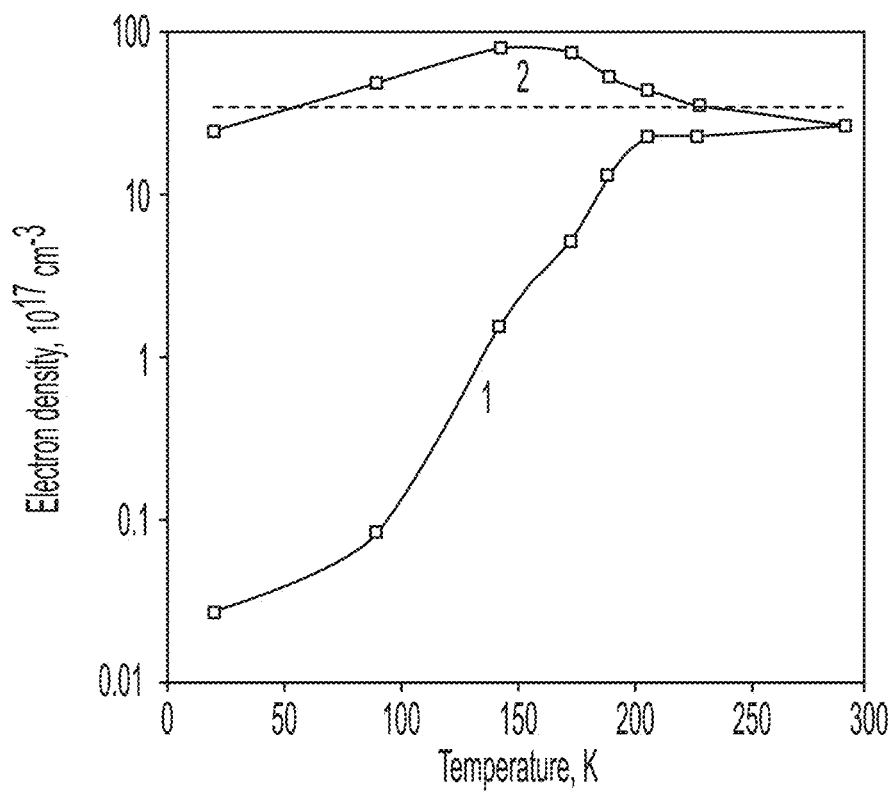
FIG. 8 is a plot of theoretical calculations of temperature dependence of electron density of a vanadium dioxide ($VO_2$) film (1) assuming constant electron mobility and (2) assuming temperature dependent electron mobility.

The electron density of $VO_2$ has been calculated based upon theoretical considerations by Pergament et al., and shown in FIG. 8. See A. Pergament, A. Crunteanu and A. Beaumontl, "Vanadium Dioxide: Metal-Insulator Transition, Electrical Switching and Oscillations. A Review of State of the Art and Recent Progress," in *Energy Materials and Nanotechnology (EMN) Meeting on Computation and Theory*, Istanbul, 2015. From the theoretical calculations, we see that the predicted estimates for electron density for constant electron mobility (line (1)) and temperature dependent electron mobility (line (2)) assumptions converge at room temperature with a value of approximately $4 \times 10^{18}$ per cubic centimeter ($cm^3$).

Using these material properties for a $VO_2$ thermometric layer, along with eq. (15) for responsivity $R_v$, eq. (17) for normalized detectivity $D^*$, and eq. (23) for noise equivalent difference temperature NEDT and COMSOL Multiphysics® simulation results of FIG. 6 for metamaterial absorptivity, predictions for a metamaterial detector performance figures of merit can be estimated for various simulated microbolometers, including the one summarized in Table 1.

Figure 9:
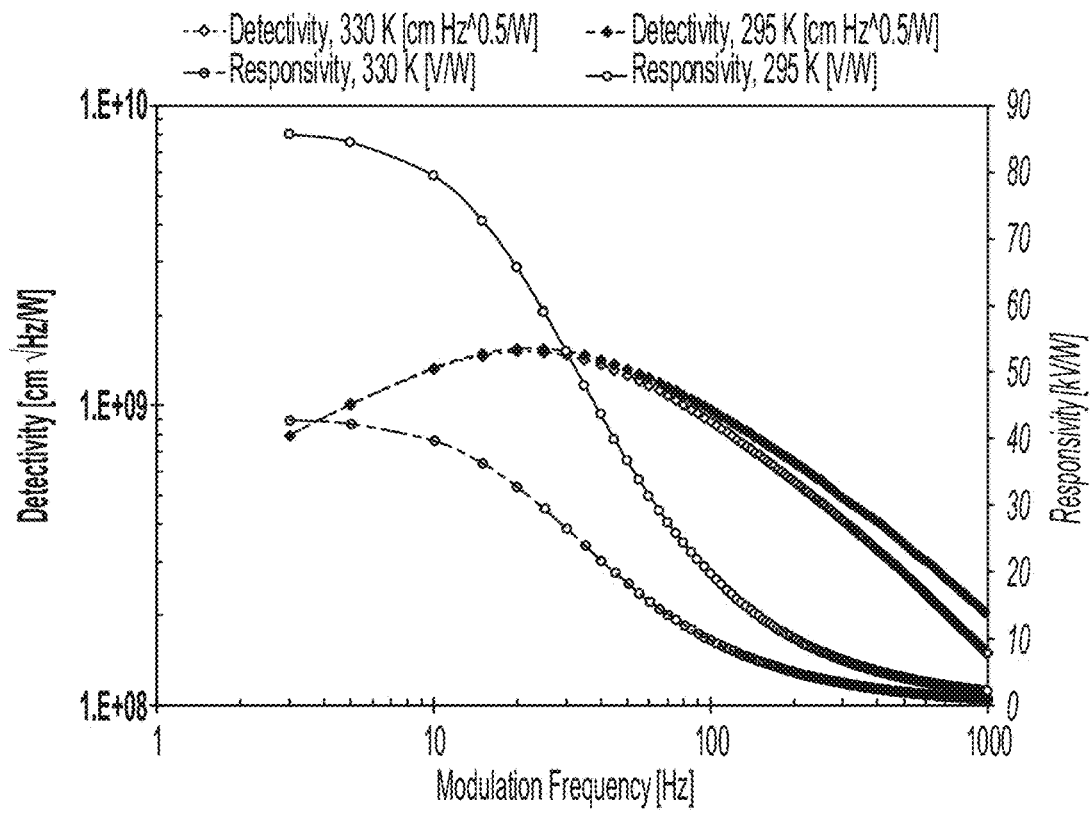
FIG. 9 is a plot of detectivity versus modulation frequency for a simulated example of a metamaterial cell, according to illustrative embodiments of the present disclosure.
Figure 10:
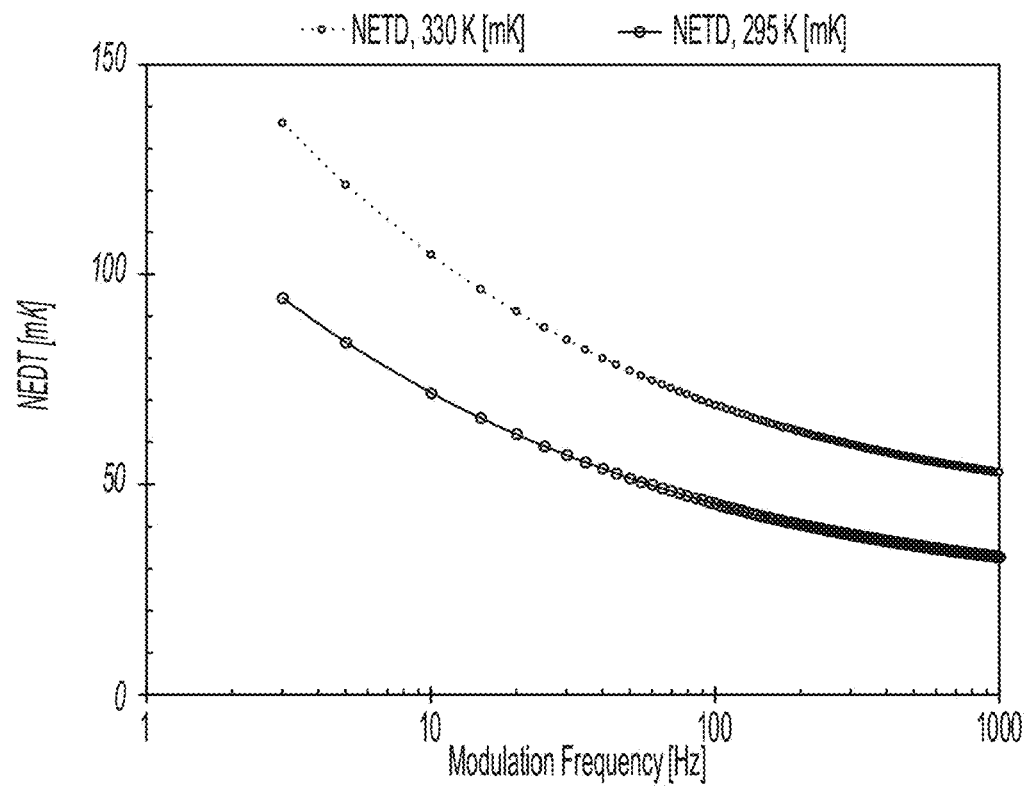
FIG. 10 is a plot of noise equivalent difference temperature (NEDT) versus modulation frequency for a simulated example of a metamaterial cell, according to illustrative embodiments of the present disclosure.

Using the detector figures of merit as a set of discriminators, a series of analytical trade-off studies was conducted to optimize room temperature detector performance for a 60 Hz modulation frequency. Optimized results are summarized in FIGS. 9-10 which shows the results for detector trends in responsivity, detectivity, and NEDT as a function of modulation frequency at temperatures of 295 K and 330 K. The results in FIGS. 9-10 are based upon an IR absorptivity of 90% corresponding approximately to a detector absorption spectra in accordance with FIG. 6 in a wavenumber range of 4000 $cm^{-1}$-2000 $cm^{-1}$. The detector figures of merit for a modulation frequency f=60 Hz and modulation bandwidth $\Delta f$=10 Hz are detectivity $D^*$ of $1.23 \times 10^9$ cm$\sqrt{Hz}$/W and $1.16 \times 10^9$ cm$\sqrt{Hz}$/W at 295 K and 330 K, respectively, and NEDT of 50 millikelvin (mK) and 75 mK at 295 K and 330 K, respectively.

Figure 11:
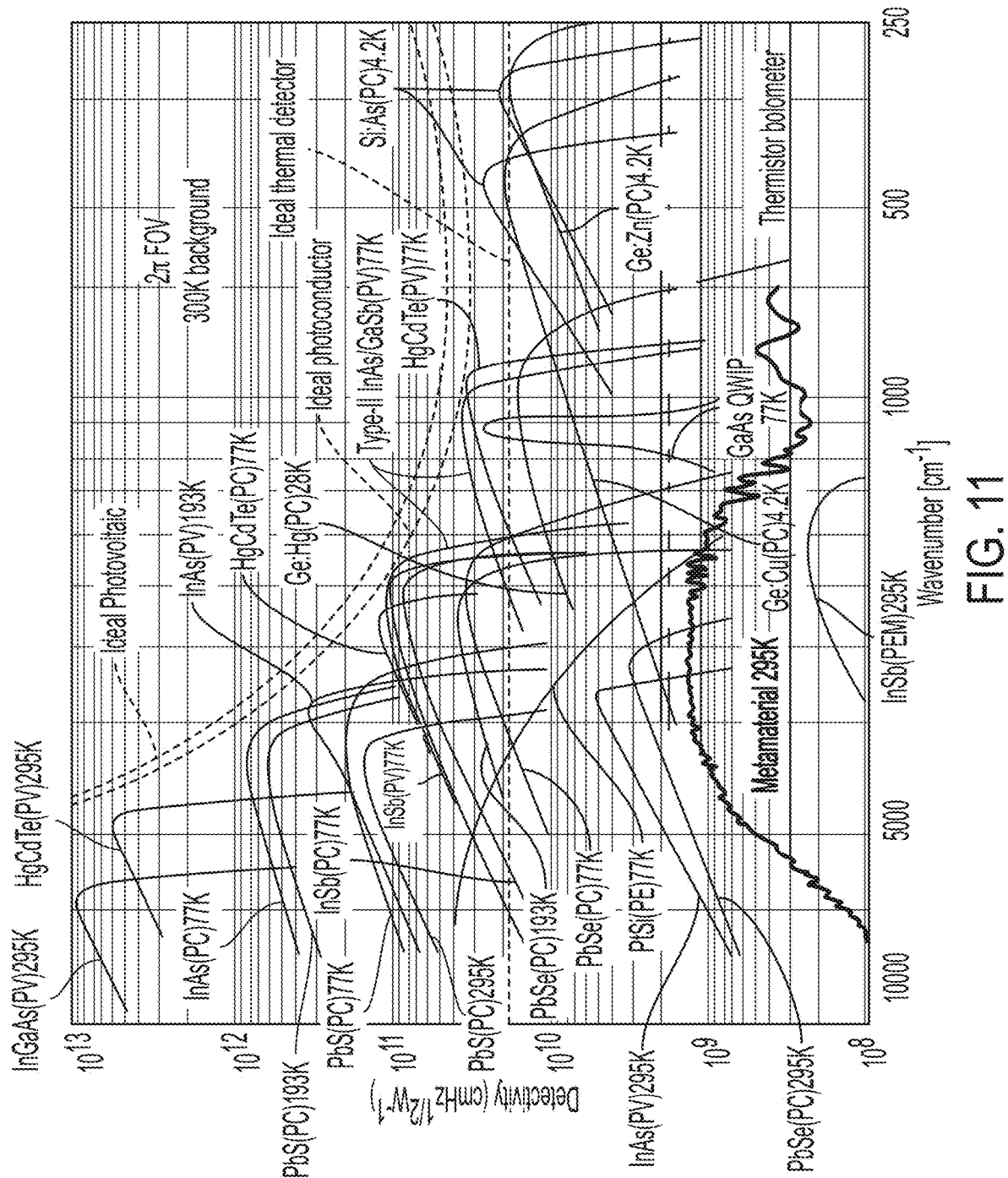
FIG. 11 is a plot of detectivity versus wavenumber for a range of commercially available IR detectors and a detector including an example of a metamaterial cell, according to illustrative embodiments of the present disclosure.

The values of figures of merit given in the preceding paragraph are near the lower regime of performance for high performance cryogenically cooled detectors, which is significant because the simulated microbolometers are uncooled, as illustrated in FIG. 11. FIG. 11 includes the detectivity spectrum of the metamaterial bolometer summarized in Table 1 superimposed onto spectra for various commercially available infrared detector technologies operated at the noted temperatures and over the wavenumber range from 10000 $cm^{-1}$-250 $cm^{-1}$. The metamaterial based detectivity spectrum shown in FIG. 11 is near the lower regime of performance for the cryogenically cooled technologies summarized, but cryogenic cooling such as the photon detection based Ge:Cu cooled to 4.2 K, Ge:Hg at 28 K, and the photovoltaic HgCdTe and Type-II InAs/GaSb both cooled at 77 K are required to address a comparable wavenumber range.

Thus, the particular example of a microbolometer including a metamaterial cell summarized in Table 1 has suitable performance (as evidenced by the figures of merit illustrated in FIGS. 9-11) for use in analyzing samples at or near room temperature, for example at an operating temperature of fluid in a wellbore, such as a crude oil. Other microbolometers in accordance with embodiments expressly described in this specification, including those illustrated wholly or partially in the drawings, have similar performance, for example detectivities within 25%, within 10%, or within 5% of the microbolometer summarized in Table 1 (whose detectivity is plotted in FIG. 11) over a similar range of wavenumbers.

OTHER EMBODIMENTS

Certain embodiments of the present disclosure were described above. It is, however, expressly noted that the present disclosure is not limited to those embodiments, but rather the intention is that additions and modifications to what was expressly described in the present disclosure are also included within the scope of the disclosure. Moreover, it is to be understood that the features of the various embodiments described in the present disclosure were not mutually exclusive and can exist in various combinations and permutations, even if such combinations or permutations were not made express, without departing from the spirit and scope of the disclosure. Having described certain implementations of, inter alia, electromagnetic metamaterial cells and microbolometers, it will now become apparent to one of skill in the art that other implementations incorporating the concepts of the disclosure may be used. Therefore, the disclosure should not be limited to particular expressly described implementations, but rather should be limited only by the spirit and scope of the following claims.

What is claimed is:

1. An electromagnetic metamaterial cell comprising spatially separate absorptive features disposed in a planar rotationally symmetric arrangement, where each of the absorptive features comprises a curvilinear segment that is convex relative to a center of symmetry of the arrangement.

2. The metamaterial cell of claim 1, where each of the absorptive features comprises one or more forks extending from the curvilinear segment, each of the one or more forks comprising a stem and at least two tines extending from the stem.

3. The metamaterial cell of claim 2, where, for at least some of the absorptive features, a first fork of the one or more forks extends from an outer side of the curvilinear segment and a second fork of the one or more forks extends from an inner side of the curvilinear segment.

4. The metamaterial cell of claim 3, where, for the at least some of the absorptive features, (i) at least two forks extend from the outer side of the curvilinear segment, (ii) at least two forks extend from the inner side of the curvilinear segment, or (iii) both (i) and (ii).

5. The metamaterial cell of claim 3, where the first fork and the second fork are aligned.

6. The metamaterial cell of claim 2, where, for at least some of the absorptive features, the one or more forks is a plurality of forks that are disposed on a common side of the curvilinear segment.

7. The metamaterial cell of claim 2, where the at least two tines have a length to width aspect ratio of at least two.

8. The metamaterial cell of claim 2, where a spacing between adjacent tines of the at least two tines is less than a width of each of the tines.

9. The metamaterial cell of claim 2, where each of the at least two tines is longer than an average width of the curvilinear segment.

10. The metamaterial cell of claim 1, where the curvilinear segment comprises one or more notches disposed at a perimeter of the curvilinear segment.

11. The metamaterial cell of claim 10, where each of the one or more notches is disposed at a junction of a stem of a fork extending from the curvilinear segment and the curvilinear segment.

12. The metamaterial cell of claim 11, where a notch is disposed on each side of the stem of the fork.

13. The metamaterial cell of claim 1, where the rotationally symmetric arrangement has at least a three-fold symmetry.

14. The metamaterial cell of claim 13, where the rotationally symmetric arrangement has at least five-fold symmetry and no more than twelve-fold symmetry.

15. The metamaterial cell of claim 14, where the rotationally symmetric arrangement has seven-fold symmetry.

16. The metamaterial cell of claim 1, where the absorptive features are disposed in a plurality of concentric sub-arrangements.

17. The metamaterial cell of claim 16, where the concentric sub-arrangements are radially aligned.

18. The metamaterial cell of claim 16, where, for each of the absorptive features in at least some of the plurality of concentric sub-arrangements, a spacing of the one or more forks along the curvilinear segment is substantially constant relative to a size of the curvilinear segment.

19. The metamaterial cell of claim 16, where, in at least some of the plurality of concentric sub-arrangements, a size of the one or more forks relative to the curvilinear segment is substantially constant.

20. The metamaterial cell of claim 16, where, for each of the absorptive features in at least some of the plurality of concentric sub-arrangements, a minimum clearance between absorptive features in one concentric sub-arrangement and absorptive features in an adjacent sub-arrangement is substantially constant.

21. The metamaterial cell of claim 1, where the arrangement is based on a transform of concentric rhodonea curves.

22. The metamaterial cell of claim 21, where the transform is given by:

$$x = \frac{1}{\rho}\sqrt{\rho+u} - \sqrt{\frac{8}{u}}$$

$$y = \frac{1}{\rho}\sqrt{\rho-u}, \text{ where } \rho = \sqrt{u^2 + v^2}.$$

23. The metamaterial cell of claim 1, where each of the absorptive features is made essentially of gold.

24. The metamaterial cell of claim 1, where the metamaterial cell has an average thickness from 25 nm to 250 nm.

25. The metamaterial cell of claim 24, where the average thickness is from 25 nm to 75 nm.

26. The metamaterial cell of claim 24, where the average thickness is from 125 nm to 175 nm.

27. The metamaterial cell of claim 1, where the metamaterial cell has an envelope with a diameter of no more than 100 μm.

28. The metamaterial cell of claim 1, where the metamaterial cell can absorb infrared electromagnetic radiation.

29. An electromagnetic radiation detector comprising the metamaterial cell of claim 1.

30. A microbolometer comprising:
the metamaterial cell of claim 1;
a thermometric layer, where the metamaterial cell is disposed on the thermometric layer;
electrical leads, each of the electrical leads disposed on an opposite end of the thermometric layer and in electrical contact with the thermometric layer; and
a substrate, where a gap separates a bottom of the thermometric layer and a top of the substrate.

31. A Fourier-transform infrared spectroscopy (FTIR) system comprising the microbolometer of claim 30 and a source of electromagnetic radiation.

32. A method comprising:
disposing the FTIR system of claim 31 downhole in a wellbore;
providing electromagnetic radiation from the source of electromagnetic radiation;
absorbing energy from the electromagnetic radiation with the metamaterial cell after the electromagnetic radiation has interacted with a fluid in the wellbore; and
characterizing the fluid based on the absorbed energy.

* * * * *